(12) United States Patent
Ito et al.

(10) Patent No.: US 10,255,886 B2
(45) Date of Patent: Apr. 9, 2019

(54) INSPECTION RECORD APPARATUS AND INSPECTION RECORD METHOD

(71) Applicant: MITSUBISHI HEAVY INDUSTRIES, LTD., Tokyo (JP)

(72) Inventors: Shingo Ito, Tokyo (JP); Koki Tateishi, Tokyo (JP); Masumi Nomura, Tokyo (JP); Tatsuya Sakai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/510,301

(22) Filed: Oct. 9, 2014

(65) Prior Publication Data

US 2015/0109318 A1 Apr. 23, 2015

(30) Foreign Application Priority Data

Oct. 18, 2013 (JP) .................................. 2013-217748

(51) Int. Cl.
*G09G 5/30* (2006.01)
*G09G 5/02* (2006.01)
(Continued)

(52) U.S. Cl.
CPC ............... *G09G 5/30* (2013.01); *G06Q 10/10* (2013.01); *G09G 5/02* (2013.01); *G09G 5/37* (2013.01);
(Continued)

(58) Field of Classification Search
CPC .................................................. G06T 19/006
See application file for complete search history.

(56) References Cited

U.S. PATENT DOCUMENTS 6,094,625 A * 7/2000 Ralston ................... G06F 3/011
239/161
6,487,479 B1 * 11/2002 Nelson ................. G06Q 10/087
701/29.1
(Continued)

FOREIGN PATENT DOCUMENTS

JP 2003-93380 4/2003
JP 2009-264882 11/2009
(Continued)

OTHER PUBLICATIONS

Notification of Reasons for Refusal dated Feb. 21, 2017 in Japanese Patent Application No. 2013-217748, with machine translation.
(Continued)

*Primary Examiner* — Jitesh Patel
(74) *Attorney, Agent, or Firm* — Wenderoth, Lind & Ponack, L.L.P.

(57) ABSTRACT

An inspection record apparatus includes: a display unit; a memory unit configured to store inspection record data including image information concerning a subject and information concerning a damaged state of the subject, and information indicating whether the information concerning the damaged state is in a confirmed status or not; a display control unit configured to read the inspection record data to develop the information concerning the damaged state on an image corresponding to the image information, and display the resultant image onto the display unit; a detection unit configured to detect an operation for the information concerning the damaged state; a storage unit configured to store the information indicating that the information concerning the damaged state is in the confirmed status into the memory unit; and a changing unit configured to change a display manner of the information concerning the damaged state.

9 Claims, 14 Drawing Sheets

(51) Int. Cl.
    *G09G 5/37*     (2006.01)
    *G06Q 10/10*    (2012.01)
(52) U.S. Cl.
    CPC ... *G09G 2340/14* (2013.01); *G09G 2360/121* (2013.01); *G09G 2380/14* (2013.01)

(56) References Cited

U.S. PATENT DOCUMENTS

| | | | |
|---|---|---|---|
| 8,370,046 B2 | 2/2013 | Jiang et al. | |
| 8,902,254 B1* | 12/2014 | Laughlin | G06T 19/20 345/633 |
| 8,930,068 B1 | 1/2015 | Helder | B64F 5/40 701/29.1 |
| 2003/0014142 A1* | 1/2003 | Olle | G06Q 10/06 700/110 |
| 2003/0179308 A1* | 9/2003 | Zamorano | A61B 5/00 348/333.12 |
| 2003/0204332 A1* | 10/2003 | Beney | G07C 3/00 702/34 |
| 2004/0015808 A1* | 1/2004 | Pang | G03F 1/84 716/52 |
| 2004/0122618 A1* | 6/2004 | Suzuki | G07C 3/00 702/181 |
| 2005/0232767 A1* | 10/2005 | Holder | B23P 6/002 416/61 |
| 2006/0133661 A1* | 6/2006 | Takeda | G01N 21/95607 382/149 |
| 2006/0293779 A1* | 12/2006 | Nishri | G06Q 10/06 700/115 |
| 2007/0061109 A1* | 3/2007 | Wilke | G06Q 10/10 702/183 |
| 2007/0165021 A1* | 7/2007 | Hanke | G06Q 10/00 345/419 |
| 2007/0217672 A1* | 9/2007 | Shannon | G06T 7/0006 382/152 |
| 2008/0100570 A1* | 5/2008 | Friedrich | G05B 19/409 345/156 |
| 2008/0126945 A1* | 5/2008 | Munkvold | G06Q 10/06 715/733 |
| 2008/0162065 A1* | 7/2008 | Takeda | G01N 21/95607 702/82 |
| 2009/0189974 A1* | 7/2009 | Deering | G09G 3/02 348/46 |
| 2009/0292387 A1* | 11/2009 | Funakoshi | G06F 3/0481 700/110 |
| 2010/0064242 A1* | 3/2010 | Tays | G06Q 10/06 715/772 |
| 2010/0217554 A1* | 8/2010 | Knight | G06Q 10/20 702/84 |
| 2011/0115816 A1* | 5/2011 | Brackney | G06Q 10/06 345/629 |
| 2011/0251713 A1* | 10/2011 | Teshima | H01J 37/28 700/110 |
| 2011/0262026 A1* | 10/2011 | Hori | G01M 13/00 382/141 |
| 2012/0053779 A1* | 3/2012 | Fischer | B64F 5/60 701/29.6 |
| 2012/0297337 A1* | 11/2012 | St. Denis | G08G 1/168 715/810 |
| 2012/0300984 A1* | 11/2012 | Dann | G06T 19/006 382/103 |
| 2012/0316748 A1* | 12/2012 | Jegu | F01D 21/003 701/100 |
| 2013/0083063 A1* | 4/2013 | Geisner | G06T 19/006 345/633 |
| 2013/0120449 A1* | 5/2013 | Ihara | G06F 11/0727 345/633 |
| 2013/0288719 A1* | 10/2013 | Alonzo | G01C 21/00 455/457 |
| 2013/0324250 A1* | 12/2013 | Sofman | A63F 13/06 463/31 |
| 2014/0022281 A1* | 1/2014 | Georgeson | B64F 5/0045 345/633 |
| 2014/0063064 A1* | 3/2014 | Seo | G08G 1/166 345/633 |
| 2014/0181678 A1* | 6/2014 | Louchheim | G06F 3/04815 715/738 |
| 2014/0207417 A1* | 7/2014 | Messinger | G06Q 10/20 702/187 |
| 2015/0062123 A1* | 3/2015 | Yuen | G06T 19/006 345/420 |
| 2015/0134545 A1* | 5/2015 | Mann | G06F 17/5004 705/305 |

FOREIGN PATENT DOCUMENTS

| | | |
|---|---|---|
| JP | 4538790 | 9/2010 |
| JP | 2013-002390 | 1/2013 |

OTHER PUBLICATIONS

Office Action dated Sep. 5, 2017 in Japanese Application No. 2013-217748, with English Translation.

* cited by examiner

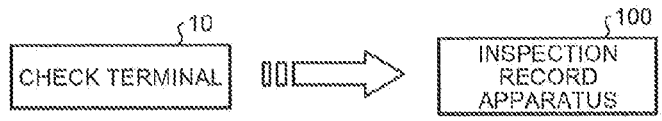
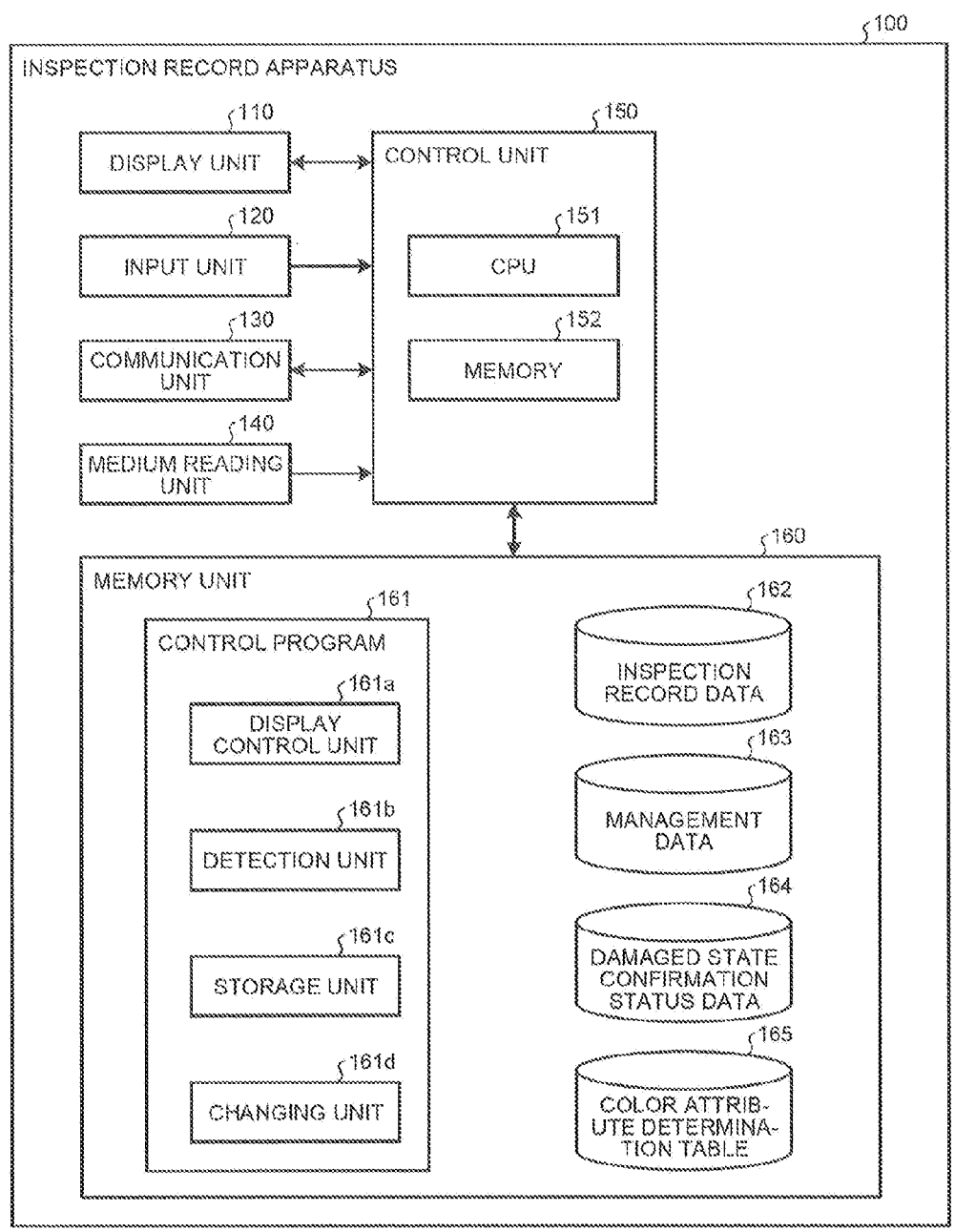

FIG.3

| SERIAL No | CHECK EXECUTION STATUS | DAMAGE DATA No |
|---|---|---|
| 0001 | NOT EXECUTED | D001 |
| 0002 | NOT EXECUTED | D002 |
| ⋮ | ⋮ | ⋮ |

FIG.4

| DAMAGE DATA No: D001 | | | | | |
|---|---|---|---|---|---|
| DAMAGE NUMBER | REGION | DAMAGE TYPE | SIZE | CONFIRMATION STATUS | COLOR ATTRIBUTE |
| 1 | VANE SURFACE | CRACK | 5 mm IN LENGTH | UNCONFIRMED | BLACK |
| 2 | VANE SURFACE | THICKNESS REDUCTION | 2 mm IN DEPTH | UNCONFIRMED | BLACK |
| 3 | VANE SURFACE | PEELED COATING | 50 mm² IN AREA | UNCONFIRMED | BLACK |

FIG.5

| COLOR ATTRIBUTE DETERMINATION TABLE |||
|---|---|---|
| DAMAGE TYPE | CONFIRMATION STATUS | COLOR ATTRIBUTE |
| PEELED COATING AREA S (mm$^2$) | CONFIRMED | RED |
| | UNCONFIRMED | BLACK |
| LENGTH OF CRACK L (mm$^2$) | ... | RED |
| | ... | BLACK |
| DEPTH OF THICKNESS REDUCTION H (mm$^2$) | ... | RED |
| | ... | BLACK |
| ⋮ | ⋮ | ⋮ |

FIG.6

| COLOR ATTRIBUTE DETERMINATION TABLE ||||
|---|---|---|---|
| DAMAGE TYPE | CONFIRMED || UNCONFIRMED |
| | EXTENT OF DAMAGE (SIZE) | COLOR ATTRIBUTE | COLOR ATTRIBUTE |
| PEELED COATING AREA S (mm$^2$) | $0 \leq S < 20$ | GREEN | BLACK |
| | $20 \leq S < 40$ | YELLOW | |
| | $40 \leq S$ | RED | |
| LENGTH OF CRACK L (mm$^2$) | ... | ... | ... |
| | ... | ... | |
| | ... | ... | |
| DEPTH OF THICKNESS REDUCTION H (mm$^2$) | ... | ... | ... |
| | ... | ... | |
| | ... | ... | |
| ⋮ | ⋮ | ⋮ | ⋮ |

| DAMAGE DATA No: D001 | | | | | |
|---|---|---|---|---|---|
| DAMAGE NUMBER | REGION | DAMAGE TYPE | SIZE | CONFIRMATION STATUS | COLOR ATTRIBUTE |
| 1 | VANE SURFACE | CRACK | 5 mm IN LENGTH | UN-CONFIRMED | BLACK |
| 2 | VANE SURFACE | THICKNESS REDUCTION | 2 mm IN DEPTH | UN-CONFIRMED | BLACK |
| 3 | VANE SURFACE | PEELED COATING | 50 mm² IN AREA | UN-CONFIRMED | BLACK |

S12

| DAMAGE DATA No: D001 | | | | | |
|---|---|---|---|---|---|
| DAMAGE NUMBER | REGION | DAMAGE TYPE | SIZE | CONFIRMATION STATUS | COLOR ATTRIBUTE |
| 1 | VANE SURFACE | CRACK | 5 mm IN LENGTH | UN-CONFIRMED | BLACK |
| 2 | VANE SURFACE | THICKNESS REDUCTION | 2 mm IN DEPTH | UN-CONFIRMED | BLACK |
| 3 | VANE SURFACE | PEELED COATING | 50 mm² IN AREA | CONFIRMED | BLACK |

S13

| DAMAGE DATA No: D001 | | | | | |
|---|---|---|---|---|---|
| DAMAGE NUMBER | REGION | DAMAGE TYPE | SIZE | CONFIRMATION STATUS | COLOR ATTRIBUTE |
| 1 | VANE SURFACE | CRACK | 5 mm IN LENGTH | UN-CONFIRMED | BLACK |
| 2 | VANE SURFACE | THICKNESS REDUCTION | 2 mm IN DEPTH | UN-CONFIRMED | BLACK |
| 3 | VANE SURFACE | PEELED COATING | 50 mm² IN AREA | CONFIRMED | RED |

FIG.11
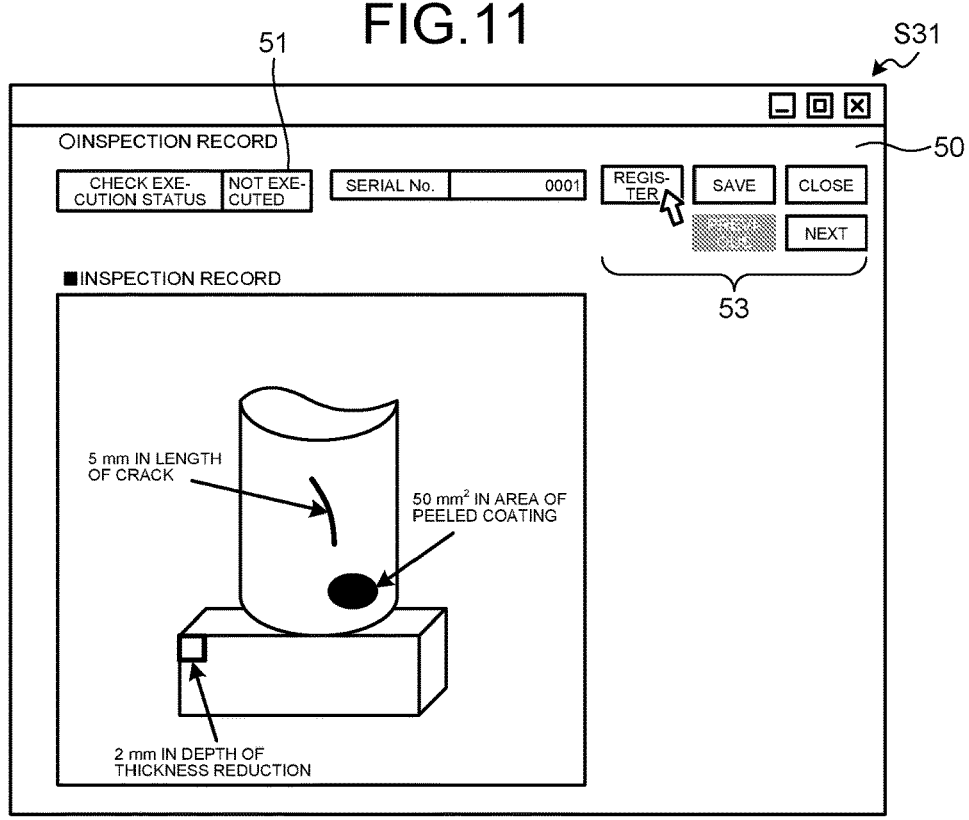
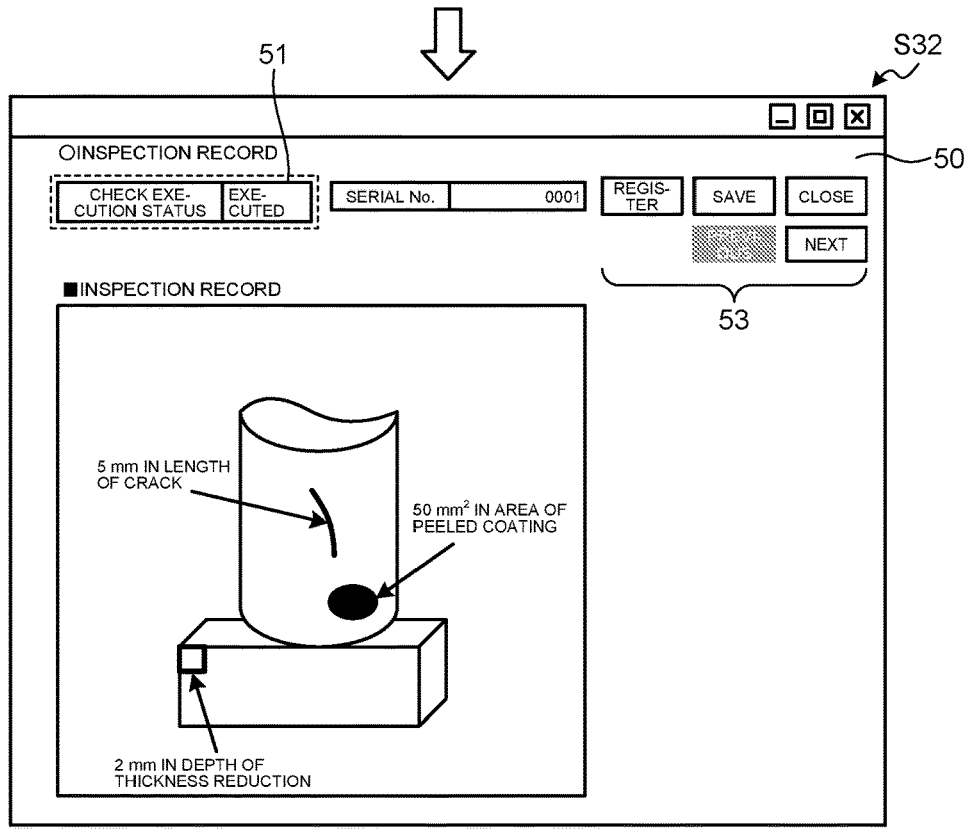

FIG.15
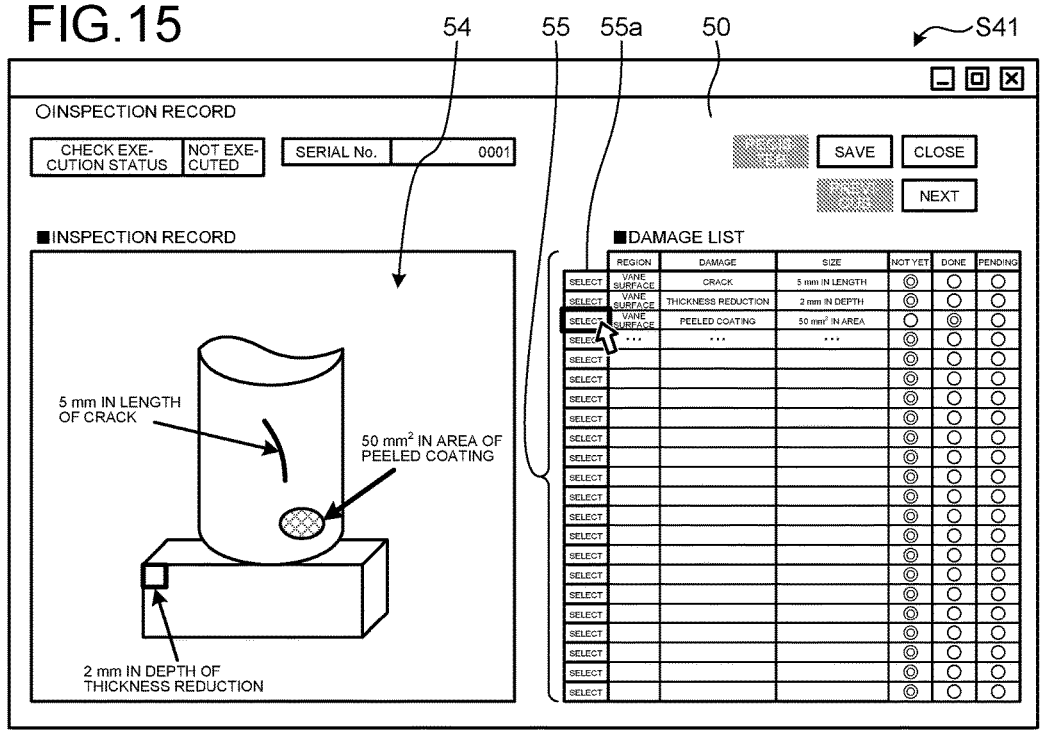
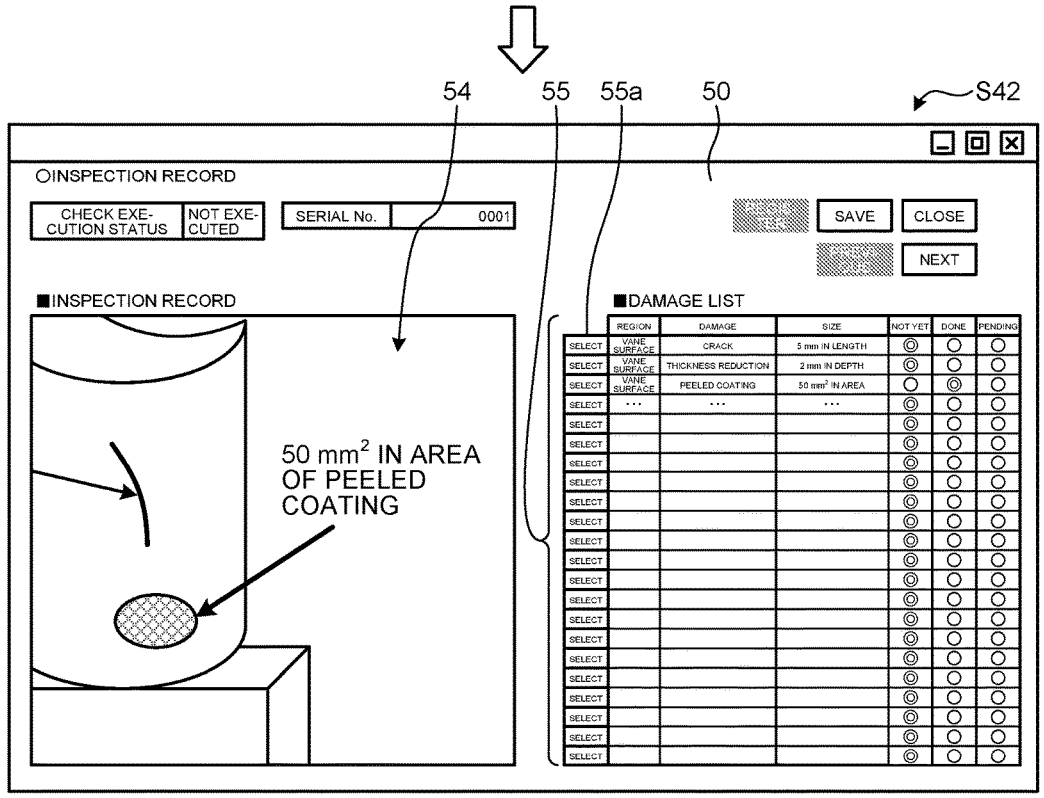

INSPECTION RECORD APPARATUS AND INSPECTION RECORD METHOD

FIELD

The present invention relates to an inspection record apparatus and an inspection record method.

BACKGROUND

Conventionally, efforts for ensuring whether portions to be confirmed of a subject to be inspected are thoroughly confirmed or not have been implemented in an inspection work. For example, Patent Literature 1 describes a technique of measuring a time for a confirmation work of an image to be inspected, and determining whether the measured time exceeds a certain time of period or not, in order to prevent a situation in which portions to be inspected that are not confirmed are left.

CITATION LIST

Patent Literature

Patent Literature 1: Japanese Patent No. 4538790

SUMMARY

Technical Problem

However, some subjects to be inspected that are subjects for the inspection work may have enormous portions to be inspected. In this case, portions that are not confirmed may be left in the inspection work for the subjects to be inspected having enormous portions to be confirmed by the simple method of determining whether the measured confirmation time exceeds a certain period of time or not, as in the technique described in Patent Literature 1.

The present invention aims to provide an inspection record apparatus and an inspection record method that can prevent the situation in which portions to be inspected that are not confirmed are left in an inspection work.

Solution to Problem

According to the present invention in order to solve the problem and achieve the aim, there is provided an inspection record apparatus including: a display unit; a memory unit configured to store inspection record data including image information concerning a subject to be inspected and information concerning a damaged state of the subject to be inspected in association with each other, and information indicating whether the information concerning the damaged state is in a confirmed status or not; a display control unit configured to read the inspection record data stored in the memory unit to develop the information concerning the damaged state on an image corresponding to the image information, and display the resultant image onto the display unit; a detection unit configured to detect an operation for the information concerning the damaged state displayed onto the display unit; a storage unit configured to store the information indicating that the information concerning the damaged state is in the confirmed status into the memory unit in association with the information concerning the damaged state, when the detection unit detects the operation; and a changing unit configured to change a display manner of the information concerning the damaged state, when the detection unit detects the operation.

The inspection record apparatus changes a display manner of information operated, by a user, out of information concerning a damaged stats developed on an image concerning a subject to be inspected. Therefore, the inspection record apparatus can allow the user to easily confirm, confirmed damage of the subject to be inspected.

As a preferable aspect of the present invention, it is preferable that the changing unit changes a display color of the information concerning the damaged state to a color different from a display color of information concerning the damaged state for which operation is not detected by the detection unit.

According to this aspect, the display color of the information operated by the user out of the information concerning the damaged state developed on the image concerning the subject to be inspected is changed to a color different from a display color of information that is not operated by the user, whereby the user can easily visually recognise the confirmed information.

As a preferable aspect of the present invention, it is preferable that the display control unit further displays list information, in which the information concerning the damaged state and the information indicating whether the information concerning the damaged state is in the confirmed status or not are associated with, each other, on the display unit, when developing the information concerning the damaged state onto an image corresponding to the image information and displaying the resultant image onto the display unit.

According to this aspect, when the information concerning the damaged, state developed on the image concerning the subject to be inspected is displayed, a list indicating whether the damage information is in a confirmed status or not is also displayed, whereby the user can easily confirm whether the damage information is in the confirmed status or not.

As a preferable aspect of the present invention, it is preferable that the detection unit detects an operation for the list information, and the display control unit highlights a portion corresponding to the information concerning the damaged state developed onto the image, when the detection unit detects the operation for the list information.

According to this aspect, the user can confirm whether the damage information is confirmed or not in the list, whereby usability of the user confirming a damaged state of the subject to be inspected can be enhanced.

As a preferable aspect of the present invention, it is preferable that the storage unit stores the information indicating that the information concerning the damaged state is in the confirmed status in the memory unit in association, with the information concerning the damaged state, when plural information pieces concerning the damaged state are present, and when the operation for each of the plural information pieces concerning the damaged state is detected by the detection unit.

According to this aspect, the user can thoroughly perform a work for confirming all damaged states of the subject to be inspected.

According to the present invention in order to solve the problem and achieve the aim, there is provided an inspection record method executed by an inspection record apparatus, the method including: reading inspection record data, which includes image information concerning a subject to be inspected and information concerning a damaged state of the subject to be inspected in association with each other, from a memory unit, developing the information concerning the damaged state onto an image corresponding to the image information, and displaying the resultant, image; and storing information, which indicates that the information concerning the damaged state is in a confirmed status, into the memory unit in association with the information concerning the damaged state, and changing a display manner of the information concerning the damaged state, when an operation for the information concerning the damaged state is detected.

In this inspection record method, the display manner of the information operated by the user, out of the information concerning the damaged state developed on the image concerning the subject to be inspected, is changed. Accordingly, a method of easily confirming the confirmed one of damage of the subject to be inspected can be realized.

Advantageous Effects of Invention

The inspection record apparatus and the inspection record method according to the present invention bring an effect of preventing a situation in which unconfirmed damage is left in an inspection work for a subject to be inspected.

BRIEF DESCRIPTION OF DRAWINGS

FIG. 1 is a diagram illustrating one example of a conceptual configuration according to an embodiment of the present invention.

FIG. 2 is a block diagram illustrating one example of functional configurations of an inspection record apparatus according to the embodiment of the present invention.

FIG. 3 is a diagram illustrating one example of a data structure of management data.

FIG. 4 is a diagram illustrating one example of a data structure of damaged state confirmation status data.

FIG. 5 is a diagram illustrating one example of a table structure of a color attribute determination table.

FIG. 6 is a diagram illustrating another example of a table structure of a color attribute determination table.

FIG. 9 is a diagram illustrating a transition example of information concerning a damaged state in the process illustrated in FIG. 7.

FIG. 11 is a diagram illustrating an example of a change in an inspection record screen in the process illustrated in FIG. 7.

FIG. 15 is a diagram illustrating an example of a change in an inspection record screen in the process illustrated in FIG. 14.

DESCRIPTION OF EMBODIMENTS

Figure 7:
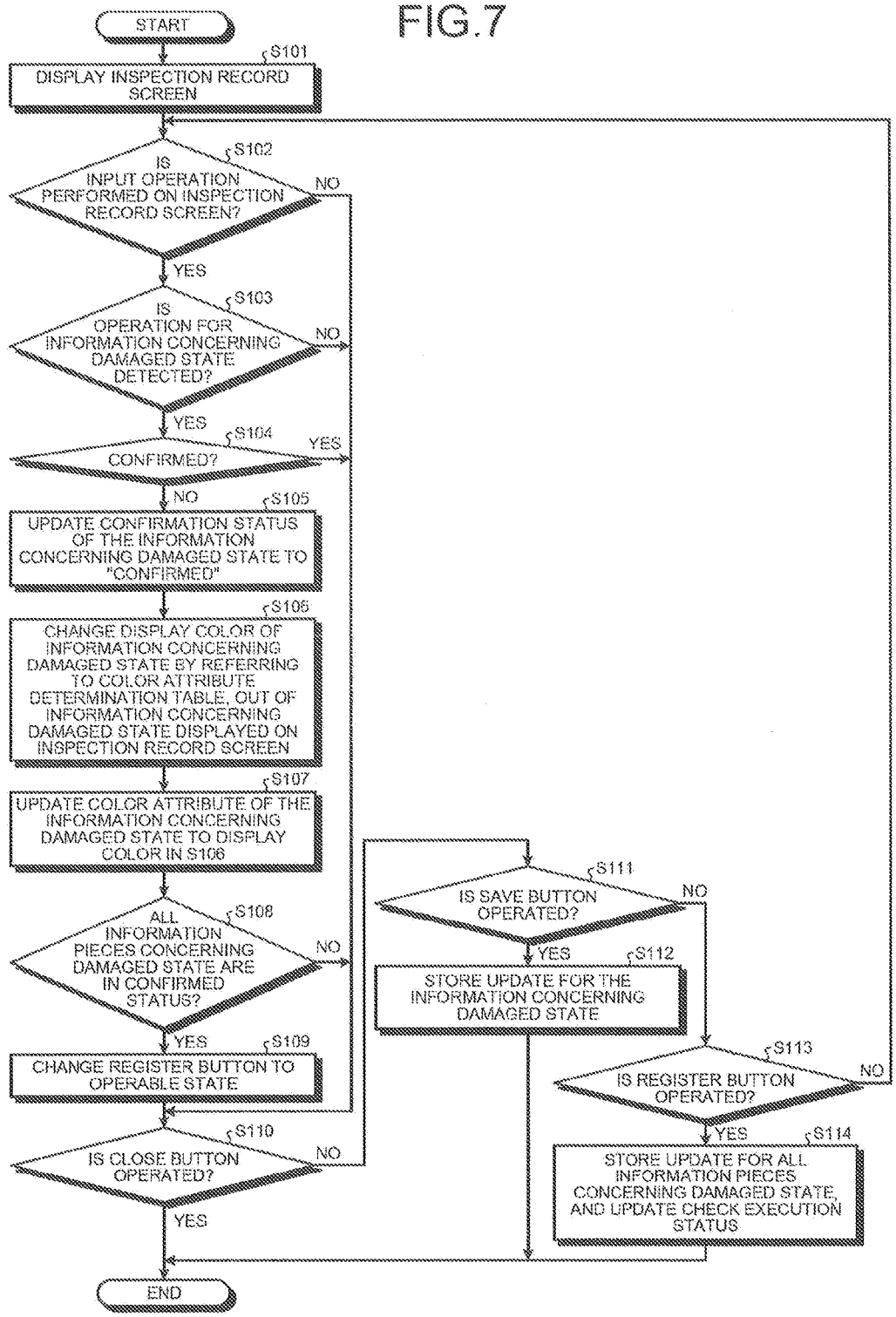
FIG. 7 is a flowchart illustrating a flow of a process executed by an inspect ion record apparatus according to a first embodiment.

Embodiments of an inspection record apparatus and an inspection record evaluation method according to the present invention will be described below in detail with reference to the drawings. The present invention is not limited to these embodiments. The components in these embodiments include those easily assumed by a person skilled in the art, those substantially the same, and their equivalents. The embodiments below describe a process executed by an inspection record apparatus, which confirms a detail of a check work and inspection work performed to a gas turbine, as one example. The inspection record apparatus and the inspection record evaluation method according to the present invention are applicable to works for confirming a detail of an inspection work for any products that are to be inspected, as well as a gas turbine.

[First Embodiment]

FIG. 1 is a diagram illustrating one example of a conceptual configuration according to the present embodiment. An operator carries a check terminal 10 illustrated in FIG. 1, and performs a check work and an inspection work of a gas turbine. The operator performs an inspection input work concerning the check and inspection of the gas turbine for the check terminal 10, and the inputs are recorded as inspection record data. An inspection record apparatus 100 acquires the inspection record data from the check terminal 10, and executes a process concerning a confirmation work of the inspection record data.

[Configuration of Inspection Record Apparatus]

FIG. 2 is a block diagram illustrating one example of functional configurations of an inspection record apparatus according to the first embodiment. As illustrated in FIG. 2, the inspection record apparatus 100 includes a display unit 110, an input unit 120, a communication unit 130, a medium reading unit 140, a control unit 150, and a memory unit 160.

The display unit 110 includes a display device such as a liquid crystal panel or an organic EL (Organic Electro-Luminescence) panel. The display unit 110 displays various information pieces such as characters, symbols, and graphics based on a control signal transmitted from the control unit 150. The input unit 120 includes an input device such as a keyboard or a mouse. The input unit 120 outputs a signal (a position of a pointer displayed on the display unit 110, for example) corresponding to an operation made by a user for the input device to the control unit 150. The communication unit 130 controls to transmit or receive information, with other devices based on a predetermined communication protocol. The medium reading unit 140 reads a program or data from a portable non-transitory storage medium such as an optical disk, an optical magnetic disk, or a memory card.

The control unit 150 includes a CPU (Central Processing Unit) 151 serving as an operation device and a memory 152 serving as a storage device. The control unit 150 executes a program by using these hardware resources to realize various functions. Specifically, the control unit 150 reads the program (for example, a control program 161) stored in the memory unit 160, develops the read program on the memory 152, and allows the CPU 151 to execute a command included in the program developed on the memory 152. The control unit 150 then reads or writes data to the memory 152 or the memory unit 160, or controls an operation of outputting information to the display unit 110 and the communication by the communication unit 130, according to the execution result of the command by the CPU 151.

The memory unit 160 includes a non-volatile storage device such as a magnetic storage device or a semiconductor storage device for storing various programs and data pieces. The programs stored in the memory unit 160 include the control program 161. The data pieces stored in the memory unit 160 include inspection record data 162, management data 163, damaged state confirmation status data 164, and a color attribute determination table 165, which are acquired from the check terminal 10. The memory unit 160 is one example of a memory unit.

In FIG. 2, all or some of the programs or the data pieces stored in the memory unit 160 may be stored in a storage medium readable by the medium reading unit 140. Alternatively, all or some of the programs or the data pieces stored in the memory unit 160 may be acquired from other devices through communication by the communication unit 130 in FIG. 2. For example, in the first embodiment, the inspection record apparatus 100 may read the storage medium, on which inspection record data stored in the check terminal 10 is written, by the medium reading unit 140. Alternatively, the inspection record apparatus 100 may acquire inspection record data from the check terminal 10 through communication by the communication unit 130.

The inspection record data 162 includes image information of a gas turbine to be inspected, and information concerning damage of the gas turbine. For example, the inspection record data 162 is composed of plural unit data pieces, each of which is recorded for each check work or each inspection work performed for the gas turbine to be inspected. A unique serial number is applied to each unit data as identification information.

The management data 163 is data for efficiently managing and searching the damaged state confirmation status data 164. FIG. 3 is a diagram illustrating one example of a data structure of the management data. As illustrated in FIG. 3, the management data 163 stores serial number, cheek execution status, and damage data number in association with one another. The serial, number corresponds to data applied to each unit data composing the inspection record data 162. The check execution status is information indicating whether a confirmation work is completed or not for each data. The damage data number is identification information uniquely applied to each of the damaged state confirmation status data pieces 164. In the example in FIG. 3, the check execution status: "not executed" and the damage data No.: "D001" are stored in association with the serial No.: "0001".

The damaged state confirmation status data 164 is data indicating a confirmation status of the information concerning damage of the gas turbine. For example, the damaged state confirmation status data 164 is composed of plural unit data pieces, each of which corresponds to each record data recorded for each check work or each inspection work performed for the gas turbine to be inspected. FIG. 4 is a diagram illustrating one example of a data structure of the damaged state confirmation status data. In FIG. 4, damage data No.: D001 will be described as one example of the unit data. As illustrated in FIG. 4, the damaged state confirmation status data 164 stores a damage number, a region, a damage type, a size, a confirmation status, and a color attribute in association with one another. The damage number is identification information applied for each damage included in the unit data. The region is information indicating a damaged part of the gas turbine. The damage type is information indicating a type of damage. The size is information indicating an extent of damage. The confirmation status is information indicating whether damage is confirmed or not in the corresponding unit data. The color attribute is information indicating a display color of information concerning a damaged state in the confirmation work for the inspection record data of the gas turbine. In the example in FIG. 4, the region: "vane surface", the damage type: "crack", the size: "5 mm in length", the confirmation status: "unconfirmed", and the color attribute: "black" are stored in association with the damage number: "1".

The color attribute determination table 165 is data that is referred to upon changing a display color of information concerning damage of the gas turbine. FIG. 5 is a diagram illustrating one example of a structure of the color attribute determination table. As illustrated in FIG. 5, the color attribute determination table 165 stores a damage type, a confirmation status, and a color attribute in association with one another. In the example in FIG. 5, the confirmation status: "confirmed" and the color attribute: "red" are associated with the damage type: "peeled coating area S $(mm^2)$". Alternatively, in the example in FIG. 5, the confirmation status: "unconfirmed" and the color attribute: "black" are associated with the damage type: "peeled coating area S $(mm^2)$".

The data structure of the color attribute determination table 165 is not limited to the example illustrated in FIG. 5. FIG. 6 is a diagram illustrating another example of a structure of the color attribute determination table. As illustrated in FIG. 6, the color attribute determination table 165 may store a damage type, a color attribute when damage is confirmed, and a color attribute when damage is unconfirmed in association with one another, and different color attributes may be assigned depending on an extent of the confirmed damage. In the example in FIG. 6, the confirmed+extent of damage (size): "$0 \leq S < 20$" and the color attribute: "green" are stored in association with the damage type: "peeled coating area S $(mm^2)$". Alternatively, in the example in FIG. 6, for example, the confirmed+extent of damage (size): "$20 \leq S < 40$" and the color attribute: "yellow" are store in association with the damage type: "peeled coating area S $(mm^2)$". In the example in FIG. 6, for example, the confirmed+extent of damage (size): "$40 \leq S$" and the color attribute: "red" are stored in association with the damage type: "peeled coating area S $(mm^2)$". Alternatively, in the example in FIG. 6, for example, the unconfirmed+color attribute: "black" are stored in association with the damage type: "peeled coating area S $(mm^2)$". The case where the color attribute determination table 165 illustrated in FIG. 5 is used will be described below.

The control program 161 provides various functions for allowing an operator to easily confirm confirmed damage of the gas turbine during a confirmation work for the inspection record data 162 of the gas turbine. For example, the control program 161 includes a display control unit 161a, a detection unit 161b, a storage unit 161c, and a changing unit 161d, as illustrated in FIG. 2.

The display control unit 161a provides a function of reading the inspection record data 162 to develop information concerning a damaged state on an image corresponding to image information included in the inspection record data 162, and displaying the resultant image onto the display unit 110. The display control unit 161a is one example of a display control unit.

The detection unit 161b provides a function of detecting an operation for the information concerning a damaged state displayed onto the inspection record screen. The detection unit 161b is one example of a detection unit.

The storage unit 161c provides a function, of storing information, which indicates that the information concerning a damaged state is already confirmed, into the memory unit 160 in association with the information concerning a damaged state, when the detection unit 161b detects the operation, for the information concerning a damaged state. The storage unit 161c is one example of a storage unit.

The changing unit 161d provides a function of changing a display manner of the information concerning a damaged state, when, the detection unit 161b detects the operation for the information concerning a damaged state. The changing unit 161d is one example of a changing unit.

[Process by Inspection Record Apparatus]

A process executed by the inspection record apparatus 100 according to the first embodiment will be described with reference to FIGS. 7 to 11. FIG. 7 is a flowchart illustrating a flow of the process executed by the inspection record apparatus according to the first embodiment. The process illustrated in FIG. 7 is executed when the control unit 150 reads the control program 161 stored in the memory unit 160.

As illustrated in FIG. 7, the control unit 150 reads the inspection record data 162 from the memory unit 160 in response to a user's request, and displays the inspection record screen onto the display unit 110 based on the read inspection record data 162 (step S101).

Figure 8:
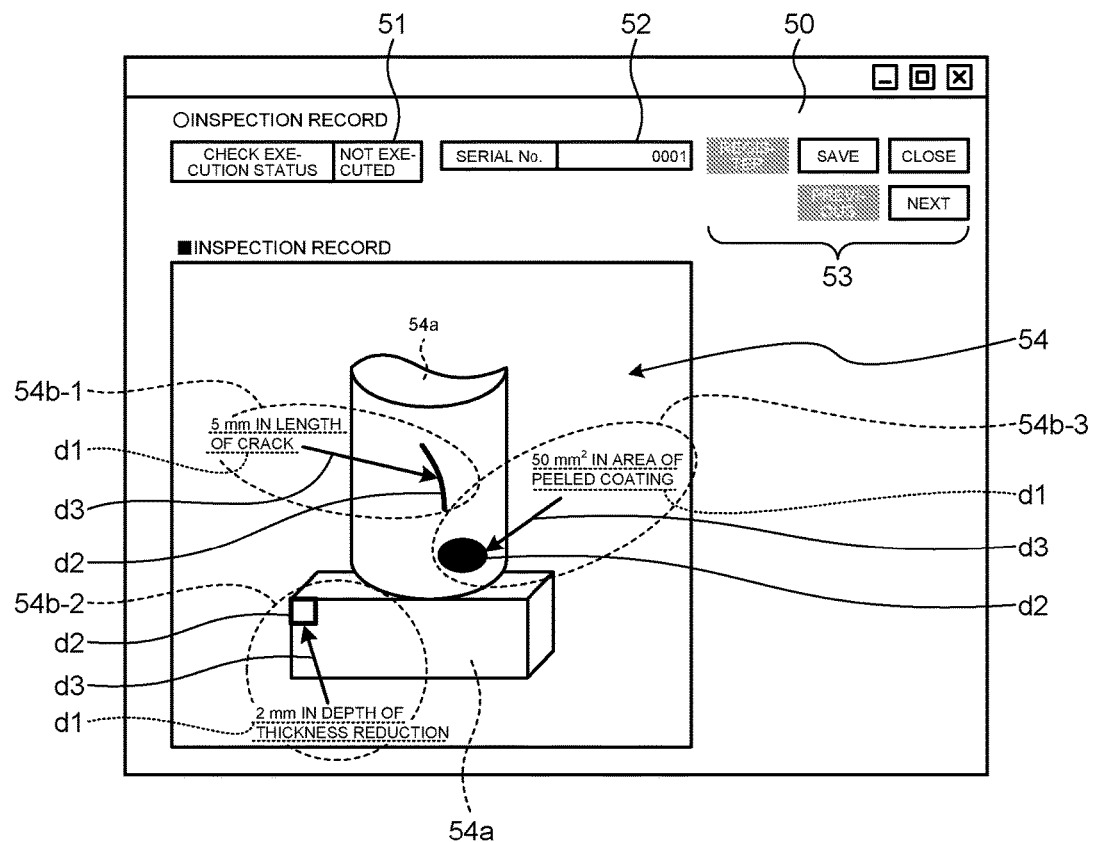
FIG. 8 is a diagram illustrating an example of a configuration of an inspection record screen.

FIG. 8 is a view illustrating an example of a configuration of the inspection record screen. As illustrated in FIG. 8, an inspection record screen 50 includes a check execution status display region 51, a serial number display region 52, a screen operation button group 53, and an inspection record display region 54. The control unit 150 acquires data of the check execution status included in the management data 163 based on the serial number of the data developed on the inspection record display region 54 in the inspection record data 162, and displays the acquired data in the check execution status display region 51. The control unit 150 displays the serial number of the data developed on the inspection record display region 54, from the inspection record data 162, onto the serial number display region 52. The screen operation button group 53 in the inspection record screen 50 includes a "register button", a "save button", a "close button", a "previous button", and a "next button." The "register button" finally receives an operation of storing the confirmation work on the inspection record screen 50. The "save button" receives an operation of temporarily storing the confirmation work on the inspection record screen 50. The "close button" receives an operation of finishing the confirmation work on the inspection record screen 50. The "previous button" receives an operation of displaying data corresponding to the previous serial number on the inspection record screen 50. The "next button" receives an operation of displaying data corresponding to the next serial number on the inspection record screen 50. In the example in FIG. 8, the "register button" is grayed out, and this indicates that the operation of finally storing the confirmation work for the data (information concerning a damaged state) displayed on the inspection record screen 50 cannot be received. Similarly, in the example in FIG. 8, the "previous button" is grayed out, and this indicates that the operation of displaying data of the previous serial number onto the inspection record screen 50 cannot be received, since the data (information concerning a damaged state) currently displayed on the inspection record screen 50 is the data corresponding to the smallest serial number.

As illustrated in FIG. 8, the control unit 150 develops information pieces 54b-1 to 54b-3 concerning a damaged state on an image 54a (image of the gas turbine) corresponding to image information included in the data to be developed on the inspection record display region 54, from the inspection record data 162, and displays the resultant image on the inspection record display region 54 of the inspection record screen 50. The information concerning the damaged state includes, for example, a comment for a damage type, an image indicating a damaged state, and an arrow linking the comment and the image. In the example in FIG. 8, three information pieces (54b-1 to 54b-3) are displayed as the information concerning the damaged state. Each of the three information pieces 54b-1 to 54b-3 that are information concerning the damaged state includes a comment d1 for the damage type, an image d2 indicating the damaged state, and an arrow d3 linking the comment d1 and the image d2. As the comment d1 for the damage type, "5 mm in crack length" is displayed in the information 54b-1 concerning the damaged state. As the comment d1 for the damage type, "2 mm in depth of thickness reduction" is displayed in the information 54b-2 concerning the damaged state. As the comment d1 for the damage type, "50 mm$^2$ in peeled coating area" is displayed in the information 54b-3 concerning the damaged state.

The control unit 150 develops the data corresponding to the smallest serial number in the inspection record data 162 on the inspection record display region 54. The control unit 150 may preliminarily receive a user's selection for a serial number of data, which is to be developed on the inspection record display region 54, in the inspection record data 162.

Returning to FIG. 7, the control unit 150 determines whether an input operation is performed or not to the inspection record screen 50 after displaying the inspection record screen 50 onto the display unit 110 (step S102). For example, the control unit 150 determines whether an input operation is performed or not based on a signal acquired from the input unit 120.

When determining that the input operation is performed to the inspection record screen 50 as a result of the determination (step S102, Yes), the control unit 150 determines whether an operation for the information concerning a damaged state is detected or not (step S103). For example, the control unit 150 detects an operation for information concerning a damaged state based on a positional relationship between a position of a pointer on the inspection record screen 50 acquired from the input unit 120 and a position of information (54b-1 to 54b-3 in FIG. 8) concerning a damaged state displayed on the inspection record screen 50.

When determining that the operation for information concerning a damaged state is detected as a result of the determination (step S103, Yes), the control unit 150 then determines whether this information concerning the damaged state is in a confirmed status or not (step S104). For example, the control unit 150 determines whether the information concerning the damaged state for which operation is detected in step S103 is in the confirmed status or not by referring to the damaged state confirmation status data 164 stored in the memory unit 160.

When determining that the information concerning the damaged state is in an unconfirmed status as a result of the determination (step S104, No), the control unit 150 updates the confirmation status of the information concerning the damaged state, out of information concerning a confirmation status recorded in the damaged state confirmation status data 164, to "confirmed" (step S105). Specifically, the control unit 150 updates the confirmation status of the damaged state confirmation status data 164 corresponding to the information concerning the damaged state for which operation is detected in S103 to "confirmed" from "unconfirmed".

Next, the control unit 150 changes a display color of the information concerning the damaged state, out of information concerning a damaged state displayed onto the inspection record screen 50, by referring to the color attribute determination table 165 (step S106). In the first embodiment, for example, the control unit 150 changes the display color of the information concerning the damaged state to "red" from "black". The control unit 150 may employ any highlighting methods for indicating that the operation is detected, such as a method of changing a font of the comment (e.g., d1 in FIG. 8) included in the information concerning a damaged state, instead of changing the display color of the information concerning a damaged state.

Then, the control unit 150 updates the color attribute of the information concerning the damaged state, out of the information of the color attribute recorded in the damaged state confirmation status data 164, to the display color in step S106 (step S107). In the first embodiment, the control unit 150 updates the display color of the information concerning the damaged state to "red" from "black".

FIG. 9 is a diagram illustrating an example of a change in the information concerning the damaged state in the process in FIG. 7. When she information (e.g., 54b-3 in FIG. 8) concerning the damaged state for which operation is detected is determined to be in an unconfirmed status (when it is not updated), the confirmation status in the damaged state confirmation status data 164 corresponding to the information concerning the damaged state for which operation is detected is updated to "confirmed" from "unconfirmed" by the control unit 150 as indicated by steps S11 to S12 in FIG. 9. When the display color of the information concerning the damaged state for which operation is detected is changed, the color attribute in the damaged state confirmation status data 164 corresponding to the information concerning the damaged state for which operation is detected is updated to "red" from "black" by the control unit 150 as indicated by steps S12 to S13 in FIG. 9.

Returning to FIG. 7, the control unit 150 then determines whether all information pieces concerning the damaged state currently displayed on the inspection record screen 50 are in the confirmed status or not (step S108).

Figure 10:
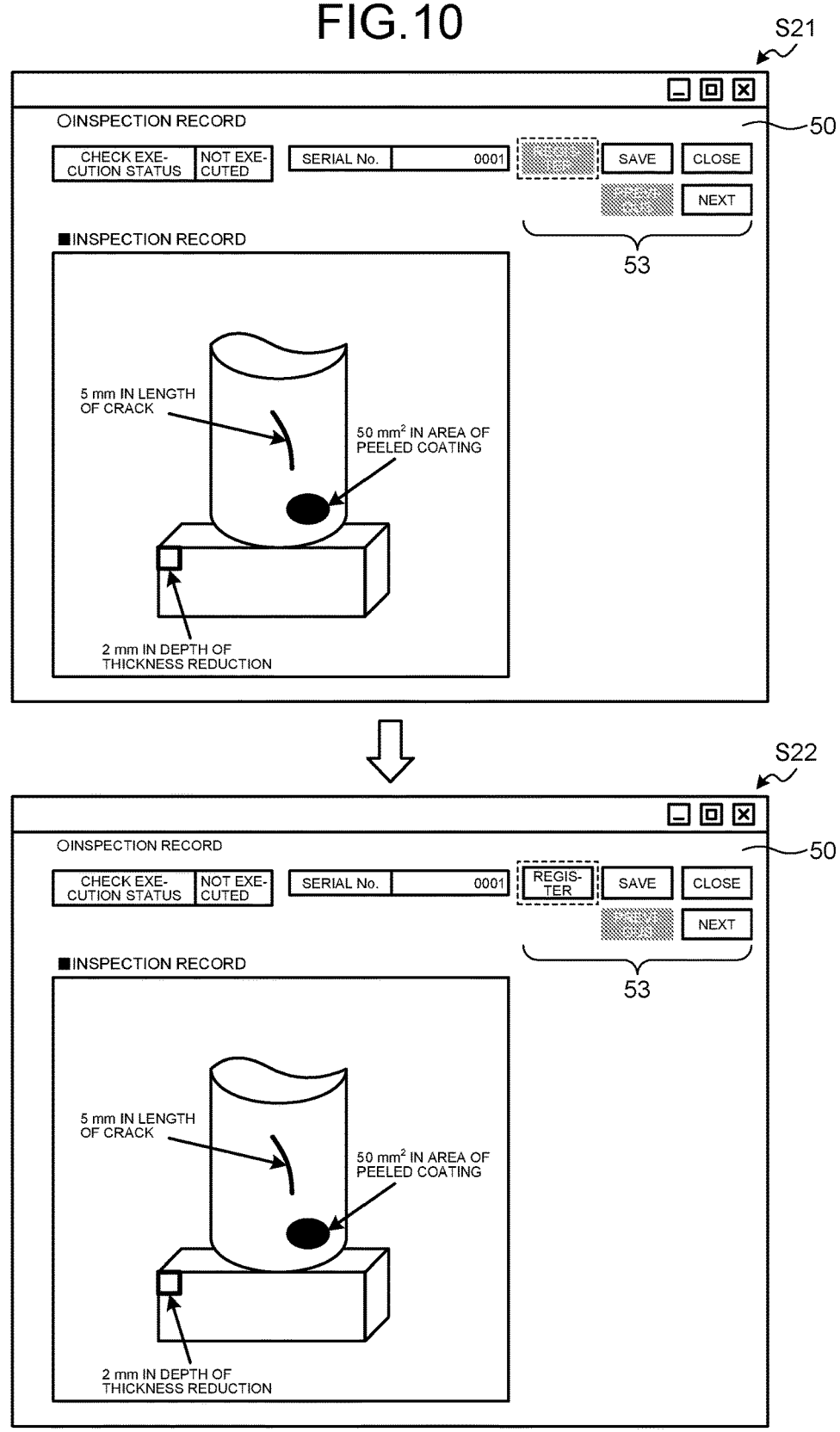
FIG. 10 is a diagram illustrating an example of a change in an inspection record screen in the process illustrated in FIG. 7.

When determining that all information pieces concerning the damaged state are in the confirmed status as a result of the determination (step S108, Yes), the control unit 150 changes the display manner of the "register button" displayed on the inspection record screen 50 to an operable state from the grayout state (step S109). FIG. 10 is a view illustrating an example of a change in the inspection record screen in the process illustrated in FIG. 7. When all information pieces concerning the damaged state (e.g., 54b-1 to 54b-3 in FIG. 8) are in the confirmed status, the display manner of the "resistor button" displayed on the inspection record screen 50 is changed to an operable state from the grayout state by the control unit 150 as indicated by steps S21 to S22 in FIG. 10.

Next, the control unit 150 determines whether the "close button" displayed on the inspection record screen 50 is operated or not (step S110).

When the "close button" is operated as a result of the determination (step S110, Yes), the control unit 150 ends the process in FIG. 7.

On the other hand, when the "close button" is not operated as a result of the determination (step S110, No), the control unit 150 determines whether the "save button" displayed on the inspection record screen 50 is operated or not (step S111).

When the "save button" is operated as a result of the determination (step S111, Yes), the control unit 150 saves the update (confirmation status and color attribute) to the information concerning the damaged state (step S112), and ends the process illustrated in FIG. 7. Specifically, when the "save button" is operated in step S111, the control unit 150 temporarily stores information that is confirmed up to this time, out of information (e.g., D001) concerning the damaged state corresponding to the serial number (e.g., 0001) displayed on the inspection record screen 50. This button is used when an operator temporarily interrupts the confirmation work for the information concerning the damaged state corresponding to the serial number (e.g., 0001) displayed on the inspection record screen 50.

On the other hand, when the "save button" is not operated as a result of the determination (step S111, No), the control unit 150 determines whether the "register button" displayed on the inspection record screen 50 is operated or not (step S113).

When the "register button" displayed on the inspection record screen 50 is operated as a result of the determination (step S113, Yes), the control unit 150 stores update (confirmation status and color attribute) to all information pieces concerning the damaged state, updates the check execution status (step S114), and ends the process in FIG. 7. Specifically, when the "register button" is operated in step S113, the control unit 150 stores all information pieces (e.g., D001) concerning the damaged state corresponding to the serial number (e.g., 0001) displayed on the inspection record screen 50 as "confirmed". This button is used when an operator finishes the confirmation work for the information concerning the damaged state corresponding to the serial number (e.g., 0001) displayed on the inspection record screen 50. FIG. 11 is a view illustrating a change in the inspection record screen during the process in FIG. 7. When the "register button" displayed on the inspection record screen 50 is operated, the check execution status display region 51 displayed on the inspection record screen 50 is updated to "executed" from "not executed" by the control unit 150 as indicated by steps S31 to S32 of FIG. 11. The control unit 150 also updates the check execution status data in the management data 163 stored in the memory unit 160 to "executed" from "not executed", and stores this update.

On the other hand, when the "register button" displayed onto the inspection record screen 50 is not operated as a result of the determination (step S113, No), the control unit 150 returns to step S102.

When not all information pieces concerning the damaged state are in the confirmed status as a result of the determination in step S108 (step S108, No), the control unit 150 proceeds to step S110 without changing the "resister button" displayed on the inspection record screen 50 to the operable state from the grayout state as in step S109.

When the information concerning the damaged state is in the confirmed status as a result of the determination in step S104 (step S104, Yes), the control unit 150 proceeds to step S110.

When the operation for the information concerning the damaged state is not detected as a result of the determination in step S103 (step S103, No), the control unit 150 proceeds to step S110.

When the input operation is not performed on the inspection record screen 50 as a result of the determination in step S102 (step S102, No), the control unit 150 proceeds to step S110.

When the "save button" is operated in the process illustrated in FIG. 7, the control unit 150 may temporarily store the update (confirmation status and color attribute) that is executed up to this time to the information concerning the damaged state in a cache, for example, to prevent the update from being stored in the memory unit 160 until the "resistor button" is operated.

In the description above, the control unit 150 can allow the update of the information concerning the damaged state to be stored in the memory unit 160 at the stage in which the confirmation of the information concerning the damaged state corresponding to the serial number displayed on the inspection record screen 50 is completed in the process in FIG. 7. However, the inversion is not limited thereto. It may be configured such that the update of the information concerning the damaged state cannot be stored in the memory unit 160, until the confirmation work for the information concerning a damaged state corresponding to all serial numbers is completed.

As described above, in the first embodiment, the inspection record apparatus 100 changes the display manner of the information, which is operated by a user, out of the information concerning a damaged state displayed on the inspection record screen 50, whereby the user can easily confirm the information that is already confirmed out of the information concerning a damaged state. Accordingly, the first embodiment can prevent a situation in which information that is in an unconfirmed status is left in an inspection work.

In the first embodiment, the update to the information concerning a damaged state is not stored in the inspection record apparatus 100, until all information pieces concerning a damaged state displayed on the inspection record screen 50 are confirmed. Therefore, the user can thoroughly perform a work for confirming all damaged states. With this, the first embodiment can prevent a situation in which unconfirmed damage is left in an inspection work.

[Second Embodiment]

A second embodiment stated below describes a process of an inspection record apparatus 100 in the case in which list information including a list of information concerning a damaged state is displayed on the inspection record screen 50 as well as information concerning a damaged state.

Figure 12:
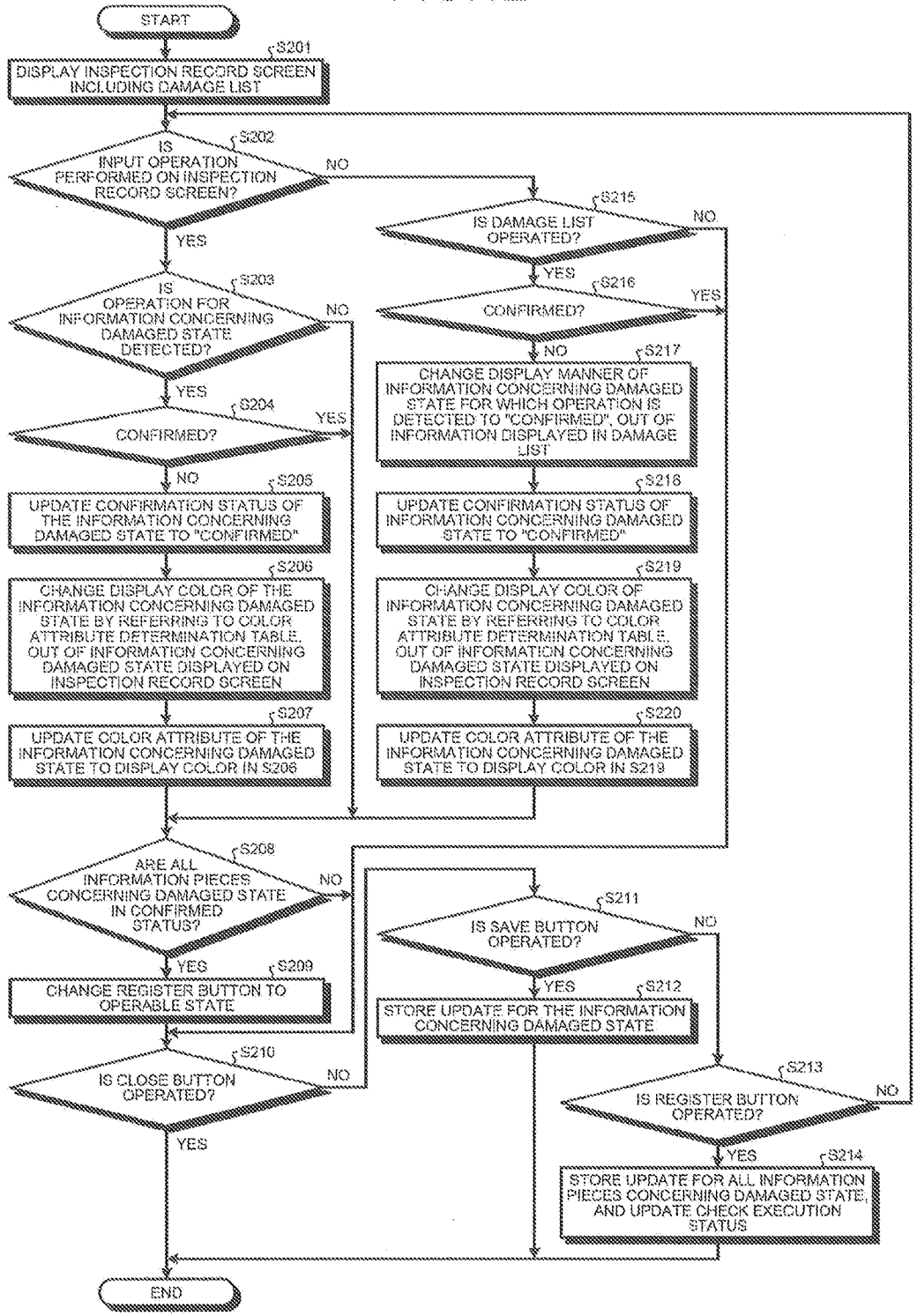
FIG. 12 is a flowchart illustrating a flow of a process executed by an inspection record apparatus according to a second embodiment.
Figure 13:
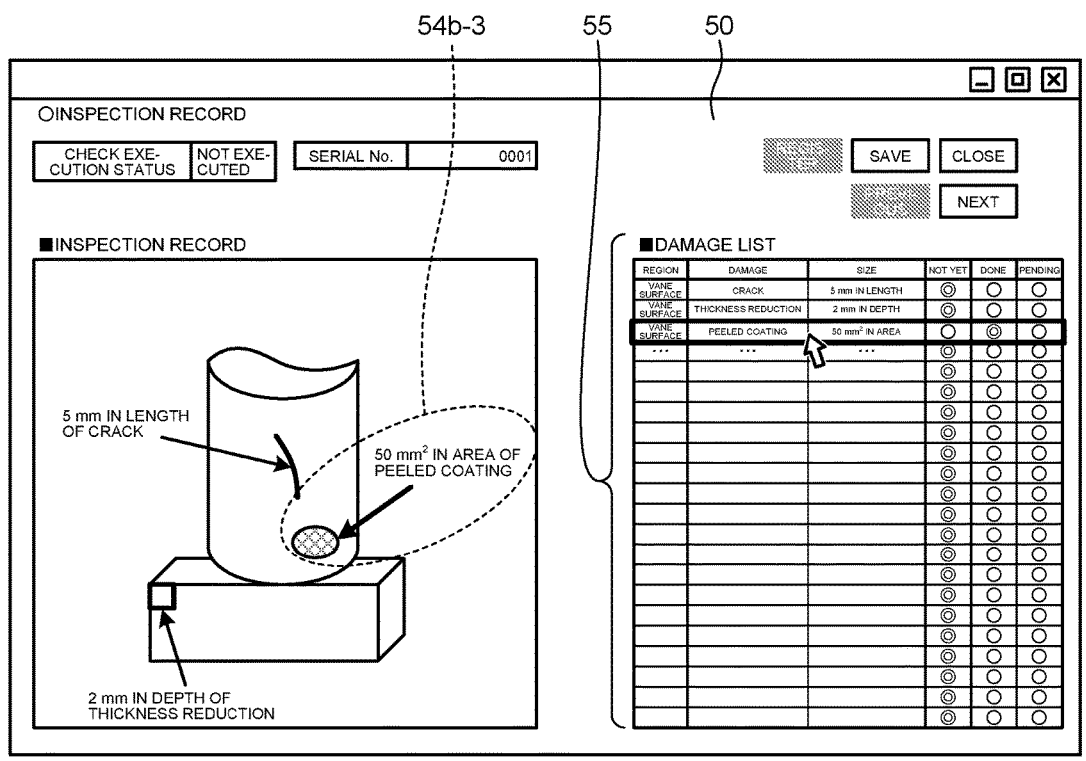
FIG. 13 is a diagram illustrating one example of information displayed on an inspection record screen according to the second embodiment.

The process by the inspection record apparatus 100 according to the second, embodiment will be described with reference to FIGS. 12 and 13. FIG. 12 is a flowchart illustrating a flow of the process executed by the inspection record apparatus according to the second embodiment. The process illustrated in FIG. 12 is executed when a control unit 150 reads a control program 161 stored in a memory unit 160. The process illustrated in FIG. 12 is different from the first embodiment in step S201 and steps S215 to S220.

As illustrated in FIG. 12, the control unit 150 reads inspection record data 162 from the memory unit 160 in response to a user's request, and displays an inspection record screen 50, which includes a list of damage, onto a display unit 110 based on the read inspection record data 162 (step S201). FIG. 13 is a diagram illustrating one example of information displayed on the inspection record screen according to the second embodiment. As illustrated in FIG. 13, the control unit 150 displays the inspection record screen 50 including a damage list 55, which is information concerning a damaged state in a form of a list, on the display unit 110.

Then, the control unit 150 determines whether an input operation is performed or not to the inspection record screen 50 (step S202).

When determining that the input operation is performed to the inspection record screen 50 as a result of the determination (step S202, Yes), the control unit 150 determines whether an operation for the information concerning a damaged state is detected or not (step S203).

When determining that the operation for information concerning a damaged state is detected as a result of the determination (step S203, Yes), the control unit 150 then determines whether this information concerning the damaged state is in a confirmed status or not (step S204).

When determining that the information concerning the damaged state is in an unconfirmed status as a result of the determination (step S204, No), the control unit 150 updates the confirmation status of the information concerning the damaged state to "confirmed" (step S205).

Next, the control unit 150 changes a display color of the information concerning the damaged state, out of information concerning a damaged state displayed onto the inspection record screen 50, by referring to a color attribute determination table 165 (step S206). Then, the control unit 150 updates the color attribute of the information concerning the damaged state to the display color in step S206 (step S207).

Then, the control unit 150 determines whether all information pieces concerning the damaged state currently displayed on the inspection record screen 50 are in the confirmed status or not (step S208).

When determining that all information pieces concerning the damaged state are in the confirmed status as a result of the determination (step S208, Yes), the control unit 150 changes the display manner of the "register button" displayed on the inspection record screen 50 to an operable state from the grayout state (step S209).

Next, the control unit 150 determines whether the "close button" displayed on the inspection record screen 50 is operated or not (step S210).

When the "close button" is operated as a result of the determination (step S210, Yes), the control unit 150 ends the process in FIG. 12.

On the other hand, when the "close button" is not operated as a result of the determination (step S210, No), the control unit 150 determines whether the "save button" displayed on the inspection record screen 50 is operated or not (step S211).

When the "save button" is operated as a result of the determination (step S211, Yes), the control unit 150 saves the update (confirmation status and color attribute) to the information concerning the damaged state (step S212), and ends the process illustrated in FIG. 12.

On the other hand, when the "save button" is not operated as a result of the determination (step S211, No), the control unit 150 determines whether the "register button" displayed on the inspection record screen 50 is operated or not (step S213).

When the "register button" displayed on the inspection record screen 50 is operated as a result of the determination (step S213, Yes), the control unit 150 stores update (confirmation status and color attribute) to all information pieces concerning the damaged state, updates the check execution status (step S214), and ends the process in FIG. 12.

On the other hand, when the "register button" displayed onto the inspection record screen 50 is not operated as a result of the determination (step S213, No), the control unit 150 returns to step S202.

When not all information pieces concerning a damaged state are in the confirmed status as a result of the determination in step S203 (step S208, No), the control unit 150 proceeds to step S210 without changing the display manner of the "resistor button" displayed on the inspection record screen 50 to the operable state from the grayout state as in step S209.

When the information concerning the damaged state is in the confirmed status as a result of the determination in step S204 (step S204, Yes), the control unit 150 proceeds to step S208. The control unit 150 may proceed to step S210 when the information concerning the damaged state is in the confirmed status as a result of the determination.

When the operation for the information concerning the damaged state is not detected as a result of the determination in step S203 (step S203, No), the control unit 150 proceeds to step S208. The control unit 150 may proceed to step S210, when the operation for the information concerning the damaged state is not detected as a result of the determination.

When the input operation is not performed on the inspection record screen 50 as a result of the determination in step S202 (step S202, No), the control unit 150 then determines whether an operation for the damage list 55 is detected or not (step S215).

When the operation for the damage list 55 is detected, as a result of the determination (step S215, Yes), the control unit 150 determines whether the information concerning the damaged state in the damage list 55 for which operation is detected is in the confirmed status or not in the damaged state confirmation status data 164 (step S216).

When the information concerning the damaged state is not in the confirmed status as a result of the determination (step S216, No), the control unit 150 changes the display manner of the information concerning the damaged state to the confirmed status out of the information displayed in the damage list 55 (step S217). Specifically, when the operation for the row of "damage: peeled coating" is detected in the damage list 55 illustrated in FIG. 13, for example, the control unit 150 changes the display manner for the row of "damage: peeled coating" such that a state of selecting an item "Done" for the row of "damage: peeled coating" is indicated. Items of "Not yet", "Done", and "Pending" corresponding to the row of "damage: peeled coating" are configured in a display manner as a radio button, for example, and an image different from an image for other items is assigned to the item operated by the user for allowing the user to recognise that the item operated by the user is currently selected.

Next, the control unit 150 updates the confirmation status of the information concerning the damaged state to "confirmed" (step S218). Then, the control unit 150 changes the display color of the information concerning the damaged state, out of information concerning the damaged state displayed on the inspection record screen 50, by referring to the color attribute determination table 165 (step S219). As illustrated in FIG. 13, the control unit changes the display color of the information (e.g., 54*b*-3) concerning the damaged state for which operation is detected out of the information displayed in the damage list 35.

The control unit 150 updates the color attribute of the information concerning the damaged state to the display color in step S219 (step S220), and then, proceeds to step S208.

When the information concerning the damaged state is in the confirmed status as a result of the determination in step S216 (step S216, Yes), the control unit 150 proceeds to step S210.

When the operation for the damage list 55 is not detected as a result of the determination in step S215 (step S215, No), the control unit 150 proceeds to step S210.

In the second embodiment, the inspection record apparatus 100 displays information concerning a damaged state on the inspection record display region 54 of the inspection record screen 50, and also displays the damage list 55 including information concerning a damaged state in a form of a list on the inspection record screen 50. Accordingly, the inspection record apparatus 100 can allow the user to easily confirm whether damage information is in the confirmed status or not. With this, the second embodiment can prevent a situation in which unconfirmed damage is left in an inspection work.

[Third Embodiment]

The third embodiment stated below describes a process of the inspection record apparatus 100 in the case in which an item for which operation is detected in the damage list 55 displayed on the inspection record screen 50 is highlighted on the inspection record display region 54 in the inspection record screen 50. The highlight corresponds to a flash display, an enlarged display, a reduced display, or a change in a display color.

Figure 14:
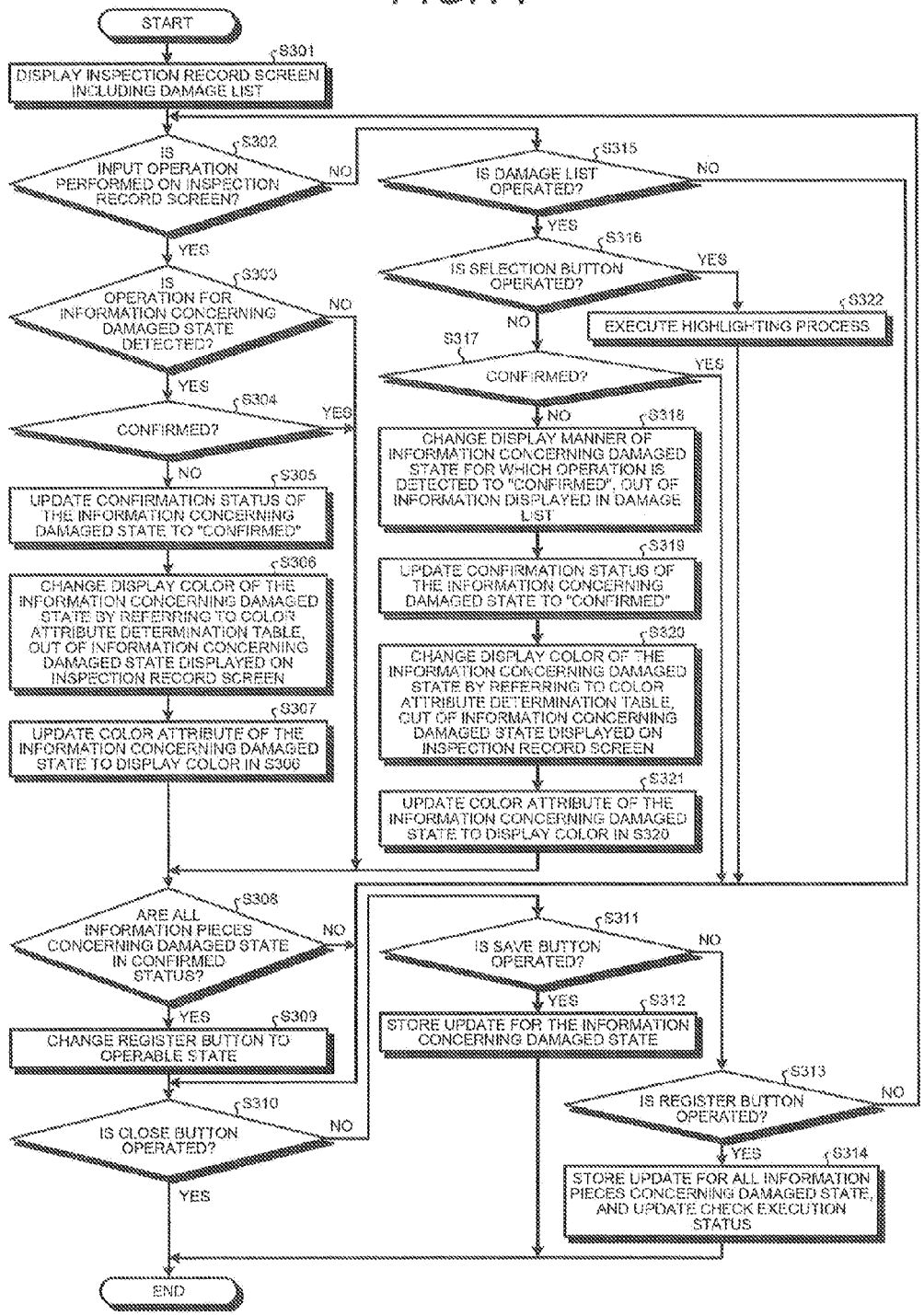
FIG. 14 is a flowchart illustrating a flow of a process executed by an inspection record apparatus according to a third embodiment.

The process by the inspection record apparatus 100 according to the third embodiment will be described with reference to FIGS. 14 to 17. FIG. 14 is a flowchart illustrating a flow of the process executed by the inspection record apparatus according to the third embodiment. The process illustrated in FIG. 14 is executed when the control unit 150 reads the control program 161 stored in the memory unit 160. The process illustrated in FIG. 14 is different from the second embodiment in step S316 and step S322.

As illustrated in FIG. 14, the control unit 150 reads inspection record data 162 from the memory unit 160 in response to a user's request, and displays the inspection record screen 50 (see FIG. 13), which includes the damage list 55, onto the display unit 110 based on the read inspection record data 162 (step S301).

Then, the control unit 150 determines whether an input operation is performed or not to the inspection record screen 50 (step S302).

When determining that the input operation is performed to the inspection record screen 50 as a result of the determination (step S302, Yes), the control unit 150 determines whether an operation for the information concerning a damaged state is detected or not (step S303).

When determining that the operation for information concerning a damaged state is detected as a result of the determination (step S303, Yes), the control unit 150 then determines whether this information concerning the damaged state is in a confirmed status or not (step S304).

When determining that the information concerning the damaged state is in an unconfirmed status as a result of the determination (step S304, No), the control unit 150 updates the confirmation status of the information concerning the damaged state to "confirmed" (step S305).

Next, the control unit 150 changes a display color of the information concerning the damaged state, out of information concerning a damaged state displayed onto the inspection record screen 50, by referring to the color attribute determination table 165 (step S306). Then, the control unit 150 updates the color attribute of the information concerning the damaged state to the display color in step S306 (step S307).

Then, the control unit 150 determines whether all information pieces concerning the damaged state currently displayed on the inspection record screen 50 are in the confirmed status or not (step S303).

When determining that all information pieces concerning the damaged state are in the confirmed status as a result of the determination (step S308, Yes), the control unit 150 changes the display manner of the "register button" displayed on the inspection record screen 50 to an operable state from the grayout state (step S309).

Next, the control unit 150 determines whether the "close button" displayed on the inspection record screen 50 is operated or not (step S310).

When the "close button" is operated as a result of the determination (step S310, Yes), the control unit 150 ends the process in FIG. 14.

On the other hand, when the "close button" is not operated as a result of the determination (step S310, No), the control unit 150 determines whether the "save button" displayed on the inspection record screen 50 is operated or not (step S311).

When the "save button" is operated as a result of the determination (step S311, Yes), the control unit 150 saves the update (confirmation status and color attribute) to the information concerning the damaged state (step S312), and ends the process illustrated in FIG. 14.

On the other hand, when the "save button" is not operated as a result of the determination (step S311, No), the control unit 150 determines whether the "register button" displayed on the inspection record screen 50 is operated or not (step S313).

When the "register button" displayed on the inspection record screen 50 is operated as a result of the determination (step S313, Yes), the control unit 150 stores update (confirmation status and color attribute) to all information pieces concerning the damaged state, updates the check execution status (step S314), and ends the process in FIG. 14.

On the other hand, when the "register button" displayed onto the inspection record screen 50 is not operated as a result of the determination (step S313, No), the control unit 150 returns to step S302.

When not all information pieces concerning a damaged state are in the confirmed status as a result of the determination in step S308 (step S308, No), the control unit 150 proceeds to step S310 without changing the display manner of the "resister button" displayed on the inspection record screen 50 to the operable state from the grayout state as in step S309.

When the information concerning the damaged state is in the confirmed status as a result of the determination in step S304 (step S304, Yes), the control unit 150 proceeds to step S308. The control unit 150 may proceed to step S310 when the information concerning the damaged state is in the confirmed status as a result of the determination.

When the operation for the information concerning the damaged state is not detected as a result of the determination in step S303 (step S303, No), the control unit 150 proceeds to step S308. The control unit 150 may proceed to step S310, when the operation for the information concerning the damaged state is not detected as a result of the determination.

When the input operation is not performed on the inspection record screen 50 as a result of the determination in step S302 (step S302, No), the control unit 150 determines whether an operation for the damage list 55 is detected or not (step S315).

When the operation for the damage list 55 is detected as a result of the determination (step S315, Yes), the control unit 150 determines whether or not this operation is an operation for a "selection button" displayed on the inspection record screen 50 (step S316).

When the operation is not the operation for the "selection button" as a result of the determination (step S316, No), the control unit 150 determines that this operation is the operation for the information concerning the damaged state in the damage list 55, and then, determines whether the information concerning the damaged state for which operation is detected is in a confirmed status or not (step S317).

When the information concerning the damaged state is not in the confirmed status as a result of the determination (step S317, No), the control unit 150 changes the display manner of the information concerning the damaged state to a confirmed status out of the information displayed in the damage list 55 (step S318).

Next, the control unit 150 updates the confirmation status of the information concerning the damaged state to "confirmed" (step S319). The control unit 150 then changes the display color of the information concerning the damaged state, out of the information, concerning the damaged state displayed on the inspection record screen 50, by referring to the color attribute determination table 165 (step S320).

Then, the control unit 150 updates the color attribute of the information concerning the damaged state to the display color in step S320 (step S321), and then, proceeds to step S308.

When the detected operation is the operation for the "selection button" as a result of the determination in step S316 (step S316, Yes), the control unit 150 executes a highlighting process (step S322), and then, proceeds to step S310. FIG. 15 is a view illustrating a change in the inspection record screen according to the process in FIG. 14. As indicated by step S41 to step S42 in FIG. 15, the information on the row corresponding to the "selection button 55a" displayed on the inspection record screen 50 is enlarged on the inspection record display region 54 by the control unit 150, when the operation for the "selection button 55a" is detected.

When the information concerning the damaged state is in the confirmed status as a result of the determination in step S317 (step S317, Yes), the control unit 150 proceeds to step S310.

When the operation for the damage list 55 is not detected as a result of the determination in step S315 (step S315, No), the control unit 150 proceeds to step S310.

Figure 16:
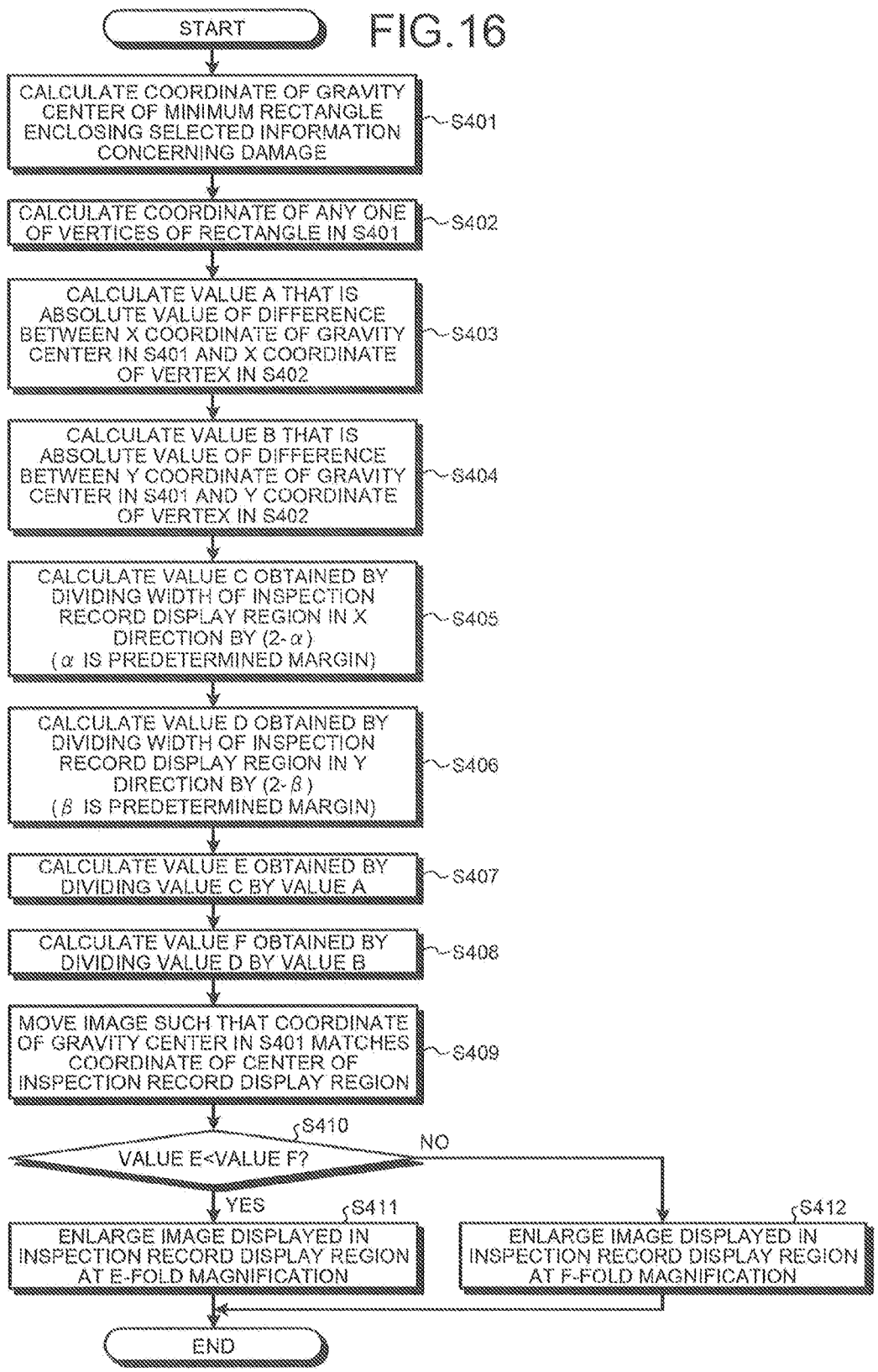
FIG. 16 is a flowchart illustrating a flow of a highlighting process according to the third embodiment.
Figure 17:
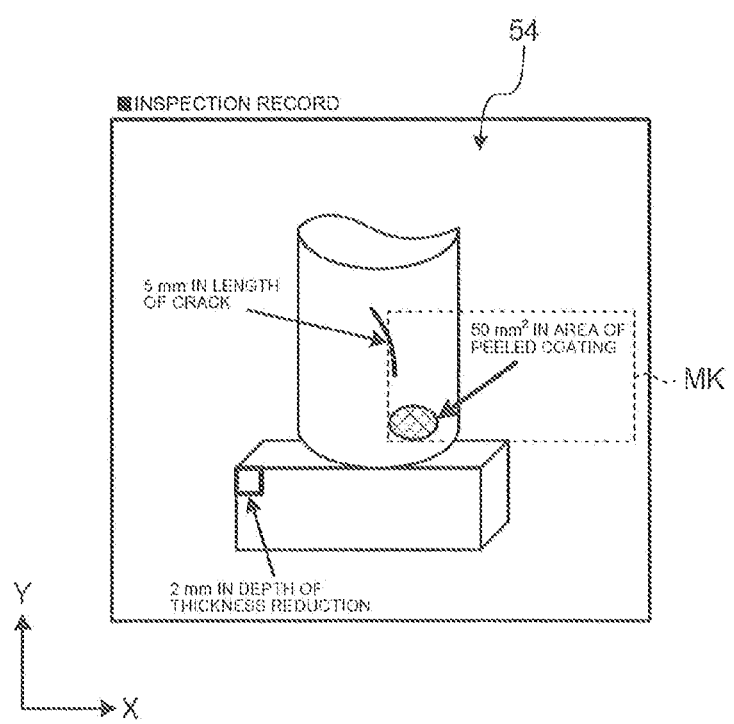
FIG. 17 is a diagram used for describing the highlighting process according to the third embodiment.

The highlighting process in step S322 in FIG. 14 will be described below. FIG. 16 is a flowchart illustrating a flow of the highlighting process according to the third embodiment. The process of enlarging and displaying the portion, for which operation is detected in the damage list 55 displayed on the inspection record screen 50, on the inspection record display region 54 of the inspection record screen 50 will be described in FIG. 16 as one example of highlighting. As illustrated in FIG. 16, the control unit 150 calculates a coordinate of a gravity center of a minimum rectangle enclosing the information concerning a damaged state, which information is selected in the damage list 55 (step S401). FIG. 17 is a view for describing the highlighting process according to the third embodiment. For example, when the row of "damage: peeled coating" is operated in the damage list 55, a rectangle MK illustrated in FIG. 17 is the minimum rectangle enclosing the information concerning the damage selected in the damage list 55.

Then, the control unit 150 calculates a coordinate of any one of vertices of the rectangle in step S401 (step S402).

The control unit 150 then calculates a value A that is an absolute value of a difference between the X coordinate of the gravity center of the rectangle in step S401 and the X coordinate of the vertex of the rectangle in step S402 (step S403).

The control unit 150 then calculates a value B that is an absolute value of a difference between the Y coordinate of the gravity center of the rectangle in step S401 and the Y coordinate of the vertex of the rectangle in step S402 (step S404).

The control unit 150 then calculates a value C obtained by dividing the width of the inspection record display region 54 in the X direction (X axis direction in FIG. 17) by (2-α) (step S405). α is a predetermined margin, and this is preliminarily set.

Then, the control unit 150 calculates a value D obtained by dividing the width of the inspection record display region 54 in the Y direction (Y axis direction in FIG. 17) by (2-β) (step S406). β is a predetermined margin, and this is preliminarily set.

Next, the control unit 150 calculates a value E obtained by dividing the value C calculated in step S405 by the value A calculated in step S403 (step S407).

Next, the control unit 150 calculates a value F obtained by dividing the value D calculated in step S406 by the value B calculated in step S404 (step S408).

Then, the control unit 150 moves an image, for example, displayed on the inspection record display region 54 such that the coordinate of the gravity center in step S401 matches the coordinate of the center of the inspection record display region 54 (step S409).

The control unit 150 then determines whether or not the value E calculated in step S407 is smaller than the value F calculated in step S408 (step S410).

When the value E calculated in step S407 is smaller than the value F calculated in step S408 as a result of the determination (step S410, Yes), the control unit 150 enlarges the image, for example, displayed on the inspection record display region 54 at E-fold magnification (step S411), and then, ends the process in FIG. 16.

On the other hand, when the value E calculated in step S407 is not smaller than the value F calculated in step S408 as a result of the determination (step S410, No), the control unit 150 enlarges the image, for example, displayed on the inspection record display region 54 at F-fold magnification (step S412), and then, ends the process in FIG. 16.

The value C calculated in step S405 and the value D calculated in step S406 may be calculated beforehand, and stored in the inspection record apparatus 100.

In the third embodiment, the inspection record apparatus 100 enlarges the portion, for which operation is detected, in the damage list 55 displayed on the inspection record screen 50, and displays the enlarged portion on the inspection record display region 54 in the inspection record screen 50. Therefore, the inspection record apparatus 100 can enhance usability of a user confirming a damaged state. Accordingly, the third embodiment can prevent a situation in which unconfirmed damage is left in an inspection work.

The aspects of the present invention described in the above embodiments can optionally be changed without departing from the scope of the present invention. For example, the control program 161 described in the above embodiments may be divided into plural modules, or may be combined to other program.

REFERENCE SIGNS LIST

10 CHECK TERMINAL
100 INSPECTION RECORD APPARATUS
110 DISPLAY UNIT
120 INPUT UNIT
130 COMMUNICATION UNIT
140 MEDIUM READING UNIT
150 CONTROL UNIT
160 MEMORY UNIT
161 CONTROL PROGRAM
162 INSPECTION RECORD DATA
163 MANAGEMENT DATA
164 DAMAGED STATE CONFIRMATION STATUS DATA
165 COLOR ATTRIBUTE DETERMINATION TABLE

The invention claimed is:

1. An inspection record apparatus comprising:
a display configured to display an inspection record screen on an image of a subject to be inspected, the inspection record screen having an inspection record display region and list information, information concerning a damaged state of the subject to be inspected being developed on the inspection record display region, the list information associating information concerning the damaged state with a confirmation status image indicating whether the information concerning the damaged state is confirmed or not for each piece of information concerning the damaged state;
a non-transitory memory that stores inspection record data including image information concerning the subject to be inspected and information concerning the damaged state of the subject to be inspected in association with each other, a control program, and information of a confirmation status indicating whether the information concerning the damaged state is in a confirmed status or not, the confirmed status being a status in which damage of the subject to be inspected is confirmed; and
a processor that executes the control program, which causes the processor to perform:
reading the inspection record data stored in the non-transitory memory, and displaying the inspection record screen having the inspection record display region and the list information onto the display;
detecting an operation for the information concerning the damaged state in the inspection record display region or an operation for the list information, the inspection record display region and the list information being displayed onto the display;
when the operation detected in the detecting is the operation for the information concerning the damaged state in the inspection record display region, changing a display manner of the information concerning the damaged state to the confirmed status; and
when the operation detected in the detecting is the operation for the information concerning the damaged state in the list information, changing a display manner of the confirmation status image corresponding to the information concerning the damaged state to a display manner indicating that the damage is confirmed, and changing a display manner of the information concerning the damaged state in the inspection record display region to the confirmed status, the information concerning the damaged state in the inspection record display region being associated with the information concerning the damaged state in the list information for which the operation is conducted, wherein the inspection record data is recorded for each check work or each inspection work performed for the subject to be inspected, wherein plural inspection record data are recorded in the non-transitory memory, wherein plural damaged state confirmation status data are recorded for each of the inspection record data, the damaged state confirmation status data including information concerning the damage state and information of the confirmation status, wherein the information of the confirmation status indicates that the information concerning the damaged state for which the operation is detected is in the confirmed status is allowed to be stored in the non-transitory memory, when (i) plural information pieces concerning the damaged state are included in at least one inspection record data from among the plural inspection record data and (ii) the operation detected in the detecting is for at least one of the plural information pieces concerning the damaged state, wherein (i) when all of the plural information pieces concerning the damaged state included in the at least one inspection record data are in the confirmed status, an inspection for the at least one inspection record data is completed and the at least one inspection record data is allowed to be stored in the non-transitory memory, and (ii) when at least one information piece from among the plural information pieces concerning the damaged state included in the at least one inspection record data is not in the confirmed status, the inspection for the at least one inspection record data is not completed and the at least one inspection record data is not allowed to be stored in the non-transitory memory, wherein the non-transitory memory finally stores, as the damaged state confirmation status data, information of the confirmation status associated with information concerning all of the damaged states on the inspection record screen, on a condition that information of confirmation status associated with information concerning all of the damaged states on the inspection record screen displayed on the display is updated to the confirmed status, wherein (i) when all of the plural information pieces concerning the damaged state included in the at least one inspection record data are in the confirmed status, a register button displayed on the inspection record screen is operable, and (ii) when at least one information piece from among the plural information pieces concerning the damaged state included in the at least one inspection record data is not in the confirmed status, the register button is not operable, and wherein when the register button is operable, the processor determines whether a save button displayed on the inspection screen is operated, and (i) when the processor determines that the save button is operated, the processor saves an update to the information concerning the damaged state, and (ii-a) when the processor determines that the save button is not operated, the processor determines whether the register button is operated, and (ii-b) when the processor determined that the register button is operated, the processor saves an update to all of the plural information pieces concerning the damaged state.

2. The inspection record apparatus according to claim 1, wherein the processor further performs:
  detecting an operation for the list information, and
  when the detecting detects the operation for the information concerning the damaged state in the list information, highlighting a portion corresponding to the information concerning the damaged state developed on the inspection record display region.

3. An inspection record apparatus comprising:
a display configured to display an inspection record screen on an image of a subject to be inspected, the inspection record screen having an inspection record display region and list information, information concerning a damaged state of the subject to be inspected being developed on the inspection record display region, the list information associating information concerning the damaged state with a confirmation status image indicating whether the information concerning the damaged state is confirmed or not for each piece of information concerning the damaged state;
a non-transitory memory that stores inspection record data including image information concerning the subject to be inspected and information concerning the damaged state of the subject to be inspected in association with each other, a control program, and information of a confirmation status indicating whether the information concerning the damaged state is in a confirmed status or not, the confirmed status being a status in which damage of the subject to be inspected is confirmed; and
a processor that executes the control program, which causes the processor to perform:
  reading the inspection record data stored in the non-transitory memory, and displaying the inspection record screen having the inspection record display region and the list information onto the display;
  detecting an operation for the information concerning the damaged state in the inspection record display region or an operation for the list information, the inspection record display region and the list information being displayed onto the display;
  when the operation is detected in the detecting, (i) determining whether the information concerning the damaged state is in the confirmed status or not and (ii) when all of plural pieces of the information concerning the damaged state are in the confirmed status, allowing an update to the information concerning the damaged state to be stored in the non-transitory memory;
  when the operation detected in the detecting is the operation for the information concerning the damaged state in the inspection record display region, changing a display manner of the information concerning the damaged state to the confirmed status; and
  when the operation detected in the detecting is the operation for the information concerning the damaged state in the list information, changing a display manner of the confirmation status image corresponding to the information concerning the damaged state to a display manner indicating that the damage is confirmed, and changing a display manner of the information concerning the damaged state in the inspection record display region to the confirmed status, the information concerning the damaged state in the inspection record display region being associated with the information concerning the damaged state in the list information for which the operation is conducted, wherein plural damaged state confirmation status data are recorded for each of the inspection record data, the damaged state confirmation status data including information concerning the damage state and information of the confirmation status, wherein the changing includes changing a display color of the information concerning the damaged state to a color different from a display color of information concerning the damaged state for which operation is not detected in the detecting such that different color attributes are assigned depending on an extent of configured damage, wherein the non-transitory memory finally stores, as the damaged state confirmation status data, information of the confirmation status associated with information concerning all of the damaged states on the inspection record screen, on a condition that information of confirmation status associated with information concerning all of the damaged states on the inspection record screen displayed on the display is updated to the confirmed status, and wherein (i) when all of the plural information pieces concerning the damaged state included in the at least one inspection record data are in the confirmed status, a register button displayed on the inspection record screen is operable, and (ii) when at least one information piece from among the plural information pieces concerning the damaged state included in the at least one inspection record data is not in the confirmed status, the register button is not operable, and wherein when the register button is operable, the processor determines whether a save button displayed on the inspection screen is operated, and (i) when the processor determines that the save button is operated, the processor saves an update to the information concerning the damaged state, and (ii-*a*) when the processor determines that the save button is not operated, the processor determines whether the register button is operated, and (ii-*b*) when the processor determined that the register button is operated, the processor saves an update to all of the plural information pieces concerning the damaged state.

4. The inspection record apparatus according to claim 3, wherein the color attributes are assigned depending on an extent of configure damage of a gas turbine vane.

5. The inspection record apparatus according to claim 4, wherein the color attributes are assigned depending on an extent of configure damage of at least one of crack length, thickness reduction depth, and peeled coating area in a gas turbine vane.

6. An inspection record method executed by an inspection record apparatus including: a display configured to display an inspection record screen on an image of a subject to be inspected, the inspection record screen having an inspection record display region and list information, information concerning a damaged state of the subject to be inspected being developed on the inspection record display region, the list information associating information concerning the damaged state with a confirmation status image indicating whether the information concerning the damaged state is confirmed or not for each piece of information concerning the damaged state; and a non-transitory memory that stores inspection record data including image information concerning the subject to be inspected and information concerning the damaged state of the subject to be inspected in association with each other, a control program, and information of a confirmation status indicating whether the information concerning the damaged state is in a confirmed status or not, the confirmed status being a status in which damage of the subject to be inspected is confirmed, the method comprising:

reading the inspection record data from the non-transitory memory, and displaying the inspection record screen having the inspection record display region and the list information onto a display;

detecting an operation for the information concerning the damaged state in the inspection record display region or an operation for the list information, the inspection record display region and the list information being displayed onto the display;

when the operation is detected in the detecting, (i) determining whether the information concerning the damaged state is in a confirmed status or not, the confirmed status being a status in which damage of the subject to be inspected is confirmed and (ii) when all of plural information pieces of the information concerning the damaged state are in the confirmed status, allowing an update to the information concerning the damaged state to be stored in the non-transitory memory;

when the operation detected in the detecting is the operation for the information concerning the damaged status in the inspection record display region, changing a display manner of the information concerning the damaged state; and when the operation detected in the detecting is the operation for the information concerning the damaged state in the list information, changing a display manner of the confirmation status image corresponding to the information concerning the damaged state to a display manner indicating that the damage is confirmed, and changing a display manner of the information concerning the damaged state in the inspection record display region to the confirmed status, the information concerning the damaged state in the inspection record display region being associated with the information concerning the damaged state in the list information for which the operation is conducted, wherein plural damaged state confirmation status data are recorded for each of the inspection record data, the damaged state confirmation status data including information concerning the damage state and information of the confirmation status, wherein the changing includes changing a display color of the information concerning the damaged state to a color different from a display color of information concerning the damaged state for which operation is not detected in the detecting such that different color attributes are assigned depending on an extent of configured damage, wherein the non-transitory memory finally stores, as the damaged state confirmation status data, information of the confirmation status associated with information concerning all of the damaged states on the inspection record screen, on a condition that information of confirmation status associated with information concerning all of the damaged states on the inspection record screen displayed on the display is updated to the confirmed status, wherein (i) when all of the plural information pieces concerning the damaged state included in the at least one inspection record data are in the confirmed status, a register button displayed on the inspection record screen is operable, and (ii) when at least one information piece from among the plural information pieces concerning the damaged state included in the at least one inspection record data is not in the confirmed status, the register button is not operable, and wherein when the register button is operable, the processor determines whether a save button displayed on the inspection screen is operated, and (i) when the processor determines that the save button is operated, the processor saves an update to the information concerning the damaged state, and (ii-*a*) when the processor determines that the save button is not operated, the processor determines whether the register button is operated, and (ii-*b*) when the processor determined that the register button is operated, the processor saves an update to all of the plural information pieces concerning the damaged state.

7. The inspection record method according to claim 6, wherein the color attributes are assigned depending on an extent of configure damage of a gas turbine vane.

8. The inspection record method according to claim 7, wherein the color attributes are assigned depending on an extent of configure damage of at least one of crack length, thickness reduction depth, and peeled coating area in a gas turbine vane.

9. An inspection record method executed by an inspection record apparatus including: a display configured to display an inspection record screen on an image of a subject to be inspected, the inspection record screen having an inspection record display region and list information, information concerning a damaged state of the subject to be inspected being developed on the inspection record display region, the list information associating information concerning the damaged state with a confirmation status image indicating whether the information concerning the damaged sate is confirmed or not for each piece of information concerning the damaged state; and a non-transitory memory that stores inspection record data including image information concerning the subject to be inspected and information concerning the damaged state of the subject to be inspected in association with each other, a control program, and information of a confirmation status indicating whether the information concerning the damaged state is in a confirmed status or not, the confirmed status being a status in which damage of the subject to be inspected is confirmed, the method comprising:

reading the inspection record data from the non-transitory memory, and displaying the inspection record screen having the inspection record display region and the list information onto the display;

detecting an operation for the information concerning the damaged state in the inspection record display region or an operation for the list information, the inspection record display region and the list information being displayed onto the display;

when the operation detected in the detecting is the operation for the information concerning the damaged state in the inspection record display region, changing a display manner of the information concerning the damaged state to the confirmed status; and when the operation detected in the detecting is the operation for the information concerning the damaged state in the list information, changing a display manner of the confirmation status image corresponding to the information concerning the damaged state to a display manner indicating that the damage is confirmed, and changing a display manner of the information concerning the damaged state in the inspection record display region to the confirmed status, the information concerning the damaged state in the inspection record display region being associated with the information concerning the damaged state in the list information for which the operation is conducted, wherein the inspection record data is recorded for each check work or each inspection work performed for the subject to be inspected, wherein plural inspection record data are recorded in the non-transitory memory, wherein plural damaged state confirmation status data are recorded for each of the inspection record data, the damaged state confirmation status data including information concerning the damage state and information of the confirmation status, wherein the information of the conformation status indicates that the information concerning the damaged state for which the operation is detected is in the confirmed status is allowed to be stored in the non-transitory memory, when (i) plural information pieces concerning the damaged state are included in at least one inspection record data from among the plural inspection record data and (ii) the operation detected in the detecting is for at least one of the plural information pieces concerning the damaged state, wherein (i) when all of the plural information pieces concerning the damaged state included in the at least one inspection record data are in the confirmed status, an inspection for the at least one inspection record data is completed and the at least one inspection record data is allowed to be stored in the non-transitory memory, and (ii) when at least one information piece from among the plural information pieces concerning the damaged state included in the at least one inspection record data is not in the confirmed status, the inspection for the at least one inspection record data is not completed and the at least one inspection record data is not allowed to be stored in the non-transitory memory, wherein the non-transitory memory finally stores, as the damaged state confirmation status data, information of the confirmation status associated with information concerning all of the damaged states on the inspection record screen, on a condition that information of confirmation status associated with information concerning all of the damaged states on the inspection record screen displayed on the display is updated to the confirmed status, wherein (i) when all of the plural information pieces concerning the damaged state included in the at least one inspection record data are in the confirmed status, a register button displayed on the inspection record screen is operable, and (ii) when at least one information piece from among the plural information pieces concerning the damaged state included in the at least one inspection record data is not in the confirmed status, the register button is not operable, and wherein when the register button is operable, the processor determines whether a save button displayed on the inspection screen is operated, and (i) when the processor determines that the save button is operated, the processor saves an update to the information concerning the damaged state, and (ii-*a*) when the processor determines that the save button is not operated, the processor determines whether the register button is operated, and (ii-*b*) when the processor determined that the register button is operated, the processor saves an update to all of the plural information pieces concerning the damaged state.

* * * * *